(12) United States Patent
Koo et al.

(10) Patent No.: US 12,149,712 B2
(45) Date of Patent: *Nov. 19, 2024

(54) VIDEO CODING METHOD ON BASIS OF TRANSFORMATION, AND DEVICE THEREFOR

(71) Applicant: LG ELECTRONICS INC., Seoul (KR)

(72) Inventors: Moonmo Koo, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,648

(22) Filed: Sep. 11, 2023

(65) Prior Publication Data
US 2023/0421780 A1    Dec. 28, 2023

Related U.S. Application Data

(63) Continuation of application No. 17/589,215, filed on Jan. 31, 2022, now Pat. No. 11,805,263, which is a
(Continued)

(51) Int. Cl.
*H04N 19/176* (2014.01)
*H04N 19/18* (2014.01)

(52) U.S. Cl.
CPC ........... *H04N 19/176* (2014.11); *H04N 19/18* (2014.11)

(58) Field of Classification Search
None
See application file for complete search history.

(56) References Cited

U.S. PATENT DOCUMENTS

2019/0246142 A1 *  8/2019  Zhao .................... H04N 19/132
2020/0382810 A1 * 12/2020  LeLeannec .......... H04N 19/105
(Continued)

FOREIGN PATENT DOCUMENTS

WO   WO-2012045037 A2 *  4/2012  ............. H04N 19/00

OTHER PUBLICATIONS

M. Koo, M. Salehifar, J. Lim, S. Kim, "CE 6-1.1 (c,d): Fast DST-7/DCT-8 based on DFT and 32 point MTS based on skipping high frequency coefficients," document Joint Video Experts Team of ITU-T SG 16 WP 3 and ISO/IEC JTC 1/SC 29/WG 11, JVET-L0132, Macao, CN, Oct. 2018.*
(Continued)

*Primary Examiner* — Michael J Hess
(74) *Attorney, Agent, or Firm* — Bryan Cave Leighton Paisner LLP

(57) ABSTRACT

A video decoding method according to the present document comprises a step of deriving transform coefficients for a current block on the basis of residual information, wherein the step of deriving the transform coefficients comprises a step of deriving a zero-out block indicating a region in which effective transform coefficients may exist in the current block, wherein the zero-out block is derived on the basis of flag information indicating whether multiple transform selection (MTS), in which a plurality of transform kernels are used, can be applied to the current block.

7 Claims, 11 Drawing Sheets

Related U.S. Application Data continuation of application No. PCT/KR2020/010487, filed on Aug. 7, 2020.

(60) Provisional application No. 62/884,669, filed on Aug. 8, 2019.

(56) References Cited

U.S. PATENT DOCUMENTS

| | | | |
|---|---|---|---|
| 2021/0235119 A1* | 7/2021 | Kim | H04N 19/593 |
| 2021/0274197 A1* | 9/2021 | Lee | H04N 19/60 |

OTHER PUBLICATIONS

M. Koo, M. Salehifar, "CE 6.1.11: AMT replacement and restriction", Joint Video Exploration Team (JVET) of ITU-T SG 16 WP 3 and ISO/IEC JTC1/SC 29/WG 11 JVET-K0096, 11th meeting, Ljubljana, SI, Jul. 10-18, 2018.*

Sole et al., Transform Coefficient Coding in HEVC, IEEE Transactions on Circuits and Systems for Video Technology, Dec. 2012.*

* cited by examiner

FIG. 6
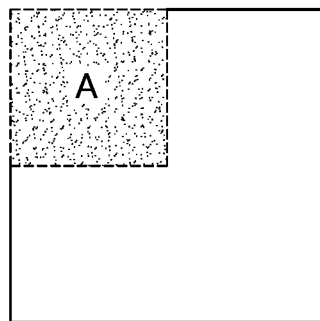
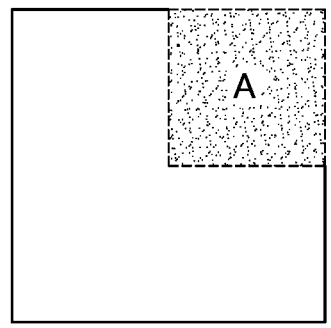
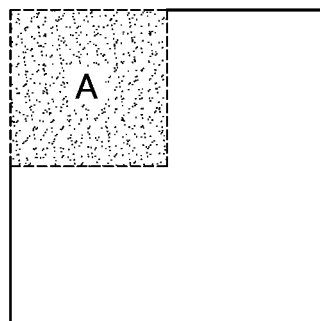
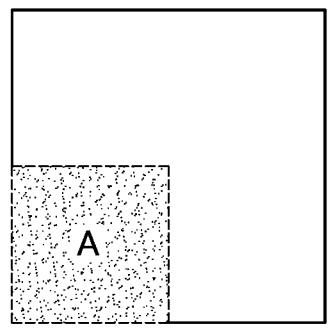

VIDEO CODING METHOD ON BASIS OF TRANSFORMATION, AND DEVICE THEREFOR

This application is a continuation application of U.S. patent application Ser. No. 17/589,215, filed on Jan. 31, 2022, which is a Bypass of PCT application No. PCT/KR2020/010487, with an international filing date of Aug. 7, 2020, which claims the benefit of U.S. Provisional Application No. 62/884,669, filed on Aug. 8, 2019, the contents of which are all hereby incorporated by reference herein in their entirety.

BACKGROUND

Technical Field

The present disclosure relates generally to an image coding technology and, more particularly, to an image coding method based on a transform in an image coding system and an apparatus therefor.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure is to provide a method and an apparatus for increasing residual coding efficiency.

Still another technical aspect of the present disclosure is to provide a method and an apparatus for increasing residual coding efficiency by coding a transform coefficient based on high-frequency zeroing.

Yet another technical aspect of the present disclosure is to provide a method and an apparatus for increasing the efficiency of image coding in which high-frequency zeroing is performed based on a multiple transform selection.

Still another technical aspect of the present disclosure is to provide a method and an apparatus for coding an image which are capable of reducing data loss when performing high-frequency zeroing.

Yet another technical aspect of the present disclosure is to provide a method and an apparatus for deriving a context model for last significant transform coefficient position information based on a current block size when coding transform coefficients for a current block (or current transform block) based on high-frequency zeroing.

According to an embodiment of the present disclosure, there is provided an image decoding method performed by a decoding apparatus. The method includes deriving transform coefficients for a current block based on residual information, wherein the deriving of the transform coefficients includes deriving a zero-out block indicating a region in which a significant transform coefficient may exist in the current block, and the zero-out block is derived based on flag information indicating whether a multiple transform selection (MTS) using a plurality of transform kernels is applicable to the current block.

The width or height of the zero-out block may be set to 16 when the MTS is applied, and the width or height of the zero-out block may be set to 32 or less when the MTS is not applied.

When flag information indicating whether a subblock transform for performing transform on a partitioned coding unit is applied to the current block is 1, the width or height of the zero-out block may be 16.

When the height of a partitioned subblock is less than 64 and the width of the subblock is 32, the width of the zero-out block may be set to 16.

When the width of a partitioned subblock is less than 64 and the height of the subblock is 32, the height of the zero-out block may be set to 16.

The transform kernels may be derived based on the partition direction of the current block and the position of a subblock to which a transform is applied.

The residual information may include last significant coefficient prefix information, and the maximum value of the last significant coefficient prefix information may be derived based on a size of the zero-out block.

According to another embodiment of the present disclosure, there is provided an image encoding method performed by an encoding apparatus. The method includes deriving residual samples for a current block and deriving transform coefficients based on the residual samples for the current block, wherein the deriving of the transform coefficients may include deriving a zero-out block indicating a region in which a significant transform coefficient may exist in the current block based on whether a multiple transform selection (MTS) using a plurality of transform kernels is applied to the current block.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

According to the present disclosure, it is possible to increase overall image/video compression efficiency.

According to the present disclosure, it is possible to increase the efficiency of residual coding.

According to the present disclosure, it is possible to increase the efficiency of residual coding by coding a transform coefficient based on high-frequency zeroing.

According to the present disclosure, it is possible to increase the efficiency of image coding in which high-frequency zeroing is performed based on a multiple transform selection.

According to the present disclosure, it is possible to reduce data loss when performing high-frequency zeroing, thereby increasing the efficiency of image coding.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

BRIEF DESCRIPTION OF THE DRAWINGS

FIG. 6 illustrates a 32-point zero-out applied to a subblock transform according to an example of the present disclosure.

DESCRIPTION OF EXEMPLARY EMBODIMENTS

Figure 1:
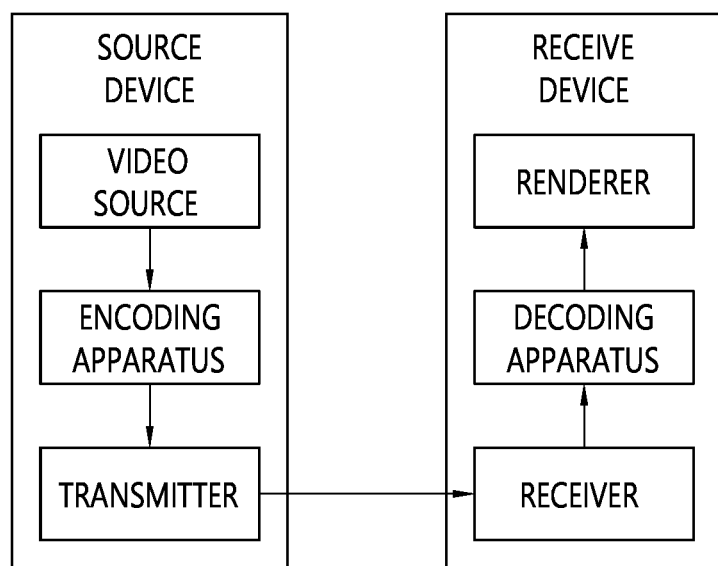
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". That is, "prediction" in the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
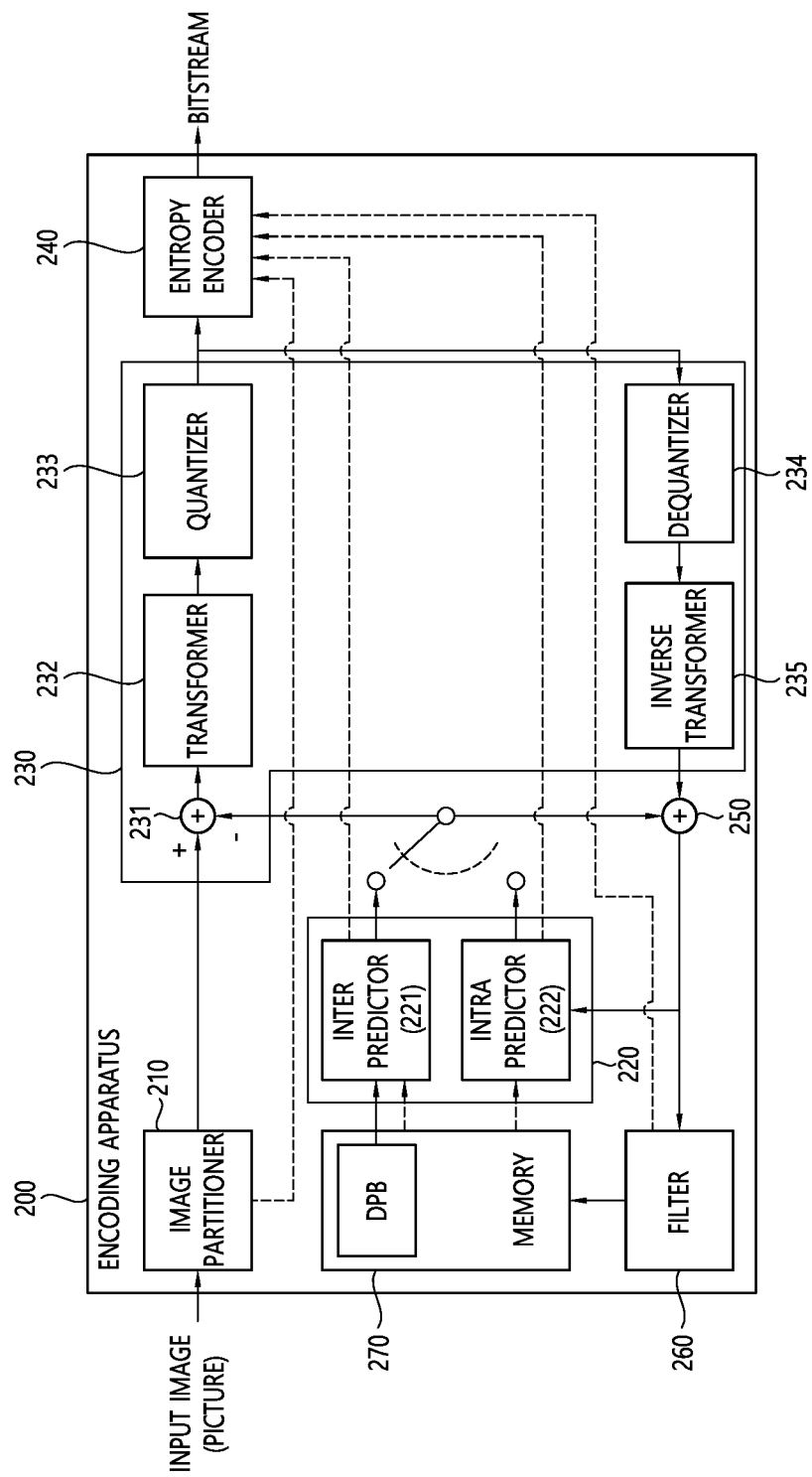
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
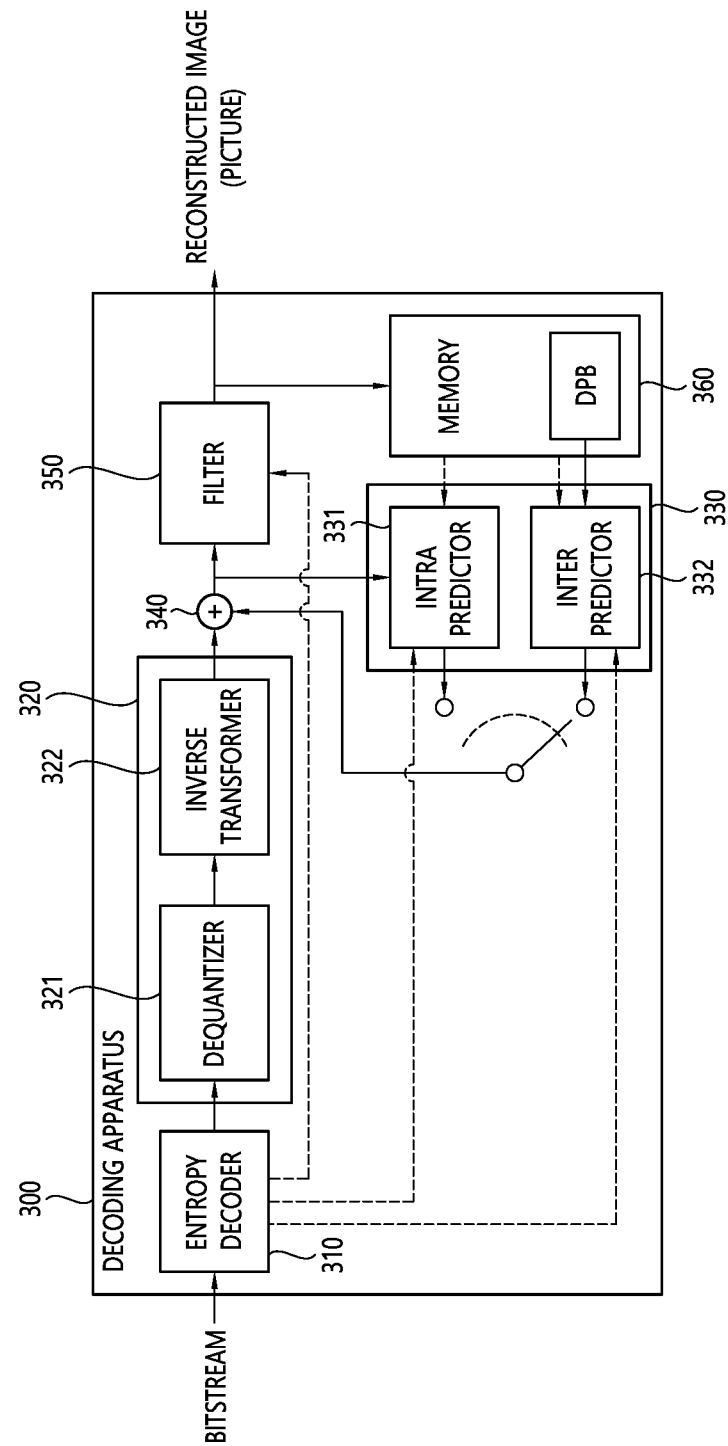
FIG. 3 is a diagram schematically illustrating a configuration of a video/image decoding apparatus to which the present disclosure is applicable FIG. 4 schematically illustrates a multiple transform technique according to an embodiment of the present disclosure.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/ received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The dequantizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
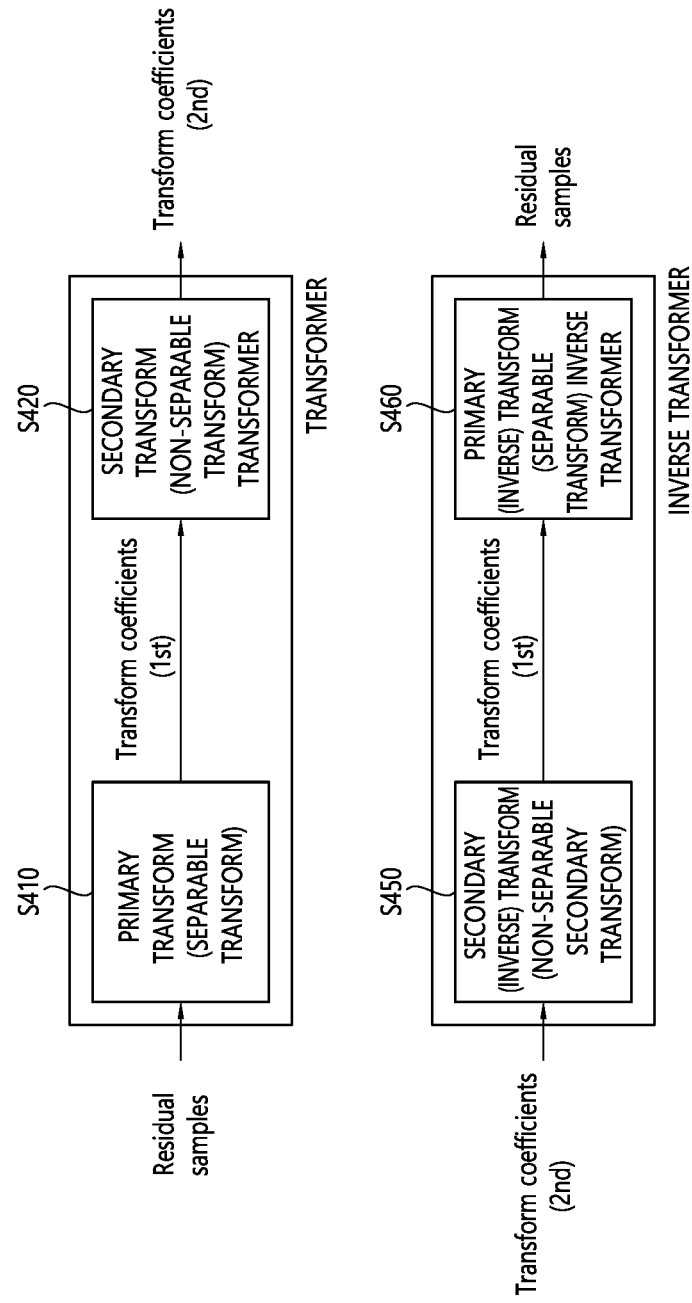

FIG. 4 schematically illustrates a multiple transform technique according to an embodiment of the present disclosure.

Referring to FIG. 4, a transformer may correspond to the transformer in the foregoing encoding apparatus of FIG. 2, and an inverse transformer may correspond to the inverse transformer in the foregoing encoding apparatus of FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

That is, when the conventional transform method is applied, transform coefficients may be generated by applying transform from a space domain to a frequency domain to a residual signal (or residual block) based on DCT type 2. However, when the multiple core transform is applied, transform coefficients (or primary transform coefficients) may be generated by applying transform from a space domain to a frequency domain to a residual signal (or residual block) based on DCT type 2, DST type 7, DCT type 8, and/or DST type 1. Here, DCT type 2, DST type 7, DCT type 8, and DST type 1 may be referred to as transform types, transform kernels, or transform cores. These DCT/DST types may be defined based on basis functions.

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST-7, and a trTypeHor or trTypeVer value of 2 may be set to DCT-8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

In one example, transform kernel sets according to MTS index information are illustrated in the following table.

TABLE 1

| tu_mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S420). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which the vertical and horizontal components of the (primary) transform coefficients are not separated, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients (S460). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST or an RST, and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an NSST (or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST).

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

Hereinafter, a reduced multiple transform technique (reduced adaptive multiple selection (or set) (RMTS)) is described.

As described above, when combinations of a plurality of transforms (DCT-2, DST-7, DCT-8, DST-1, DCT-5, and the like) are selectively used for a primary transform in a multiple transform technique (multiple transform set or adaptive multiple transform), the transform may be applied only to a predefined area to reduce complexity rather than performing the transform for all cases, thereby remarkably reducing complexity in the worst case.

For example, when the primary transform is applied to an M×M pixel block based on the foregoing reduced transform (RT) method, only calculation for a transform block of an R×R block (M>=R) may be performed instead of obtaining an M×M transform block. Consequently, non-zero coefficients exist only in an R×R region, and transform coefficients in the other region may be considered as zero without being calculated. The following table shows three examples of a reduced adaptive multiple transform (RAMT) using a reduced transform factor (R) value predefined for the size of a block to which the primary transform is applied.

TABLE 2

| Transform size | Reduced transform 1 | Reduced transform 2 | Reduced transform 3 |
| --- | --- | --- | --- |
| 8 × 8 | 4 × 4 | 6 × 6 | 6 × 6 |
| 16 × 6 | 8 × 8 | 12 × 12 | 8 × 8 |
| 32 × 32 | 16 × 16 | 16 × 16 | 16 × 16 |
| 64 × 64 | 32 × 32 | 16 × 16 | 16 × 16 |
| 128 × 128 | 32 × 32 | 16 × 16 | 16 × 16 |

According to an example, in applying the reduced multiple transforms illustrated above, the reduced transform factor may be determined based on the primary transform. For example, when the primary transform is DCT2, calculation is simple compared to other primary transforms, and thus a reduced transform may not be used for a small block or a relatively large R value may be used for a small block, thereby minimizing a decrease in coding performance. For example, different reduced transform factors may be used for DCT2 and other transforms as follows.

TABLE 3

| Transform size | Reduced transform for DCT2 | Reduced transform except DCT2 |
| --- | --- | --- |
| 8 × 8 | 8 × 8 | 4 × 4 |
| 16 × 16 | 16 × 16 | 8 × 8 |
| 32 × 32 | 32 × 32 | 16 × 16 |
| 64 × 64 | 32 × 32 | 32 × 32 |
| 128 × 128 | 32 × 32 | 32 × 32 |

As shown in Table 3, when the primary transform is DCT2, the size of the transform is not changed when the size of a block to be transformed is 8×8 or 16×16, and the reduced size of the transform is limited to 32×32 when the size of the block is 32×32 or greater.

Alternatively, according to an example, when a flag value indicating whether an MTS is applied is 0 (i.e., when DCT2 is applied for both horizontal and vertical directions), only 32 coefficients from the left and the top may be left and high-frequency components may be zeroed out, that is, set to 0s, for both (horizontal and vertical) directions (zero-out embodiment 1).

For example, in a 64×64 transform unit (TU), transform coefficients are left only in a top-left 32×32 region, in a 64×16 TU, transform coefficients are left only in a top-left 32×16 region, and in an 8×64 TU, transform coefficients are left only in a top-left 8×32 region. That is, transform coefficients exist corresponding to only up to a maximum length of 32 in both width and height.

This zero-out method may be applied only to a residual signal to which intra prediction is applied or may be applied only to a residual signal to which inter prediction is applied.

Alternatively, the zero-out method may be applied to both a residual signal to which intra prediction is applied and a residual signal to which inter prediction is applied.

A change of the transform block size, which can be expressed as the foregoing zero-out or high-frequency zeroing, refers to a process of zeroing (determining as 0s) transform coefficients related to a high frequency of a certain value or greater in a (transform) block having a first width (or length) of W1 and a first height (or length) of H1. When high-frequency zeroing is applied, the transform coefficient values of all transform coefficients outside a low-frequency transform coefficient region configured based on a second width of W2 and a second height of H2 among transform coefficients in the (transform) block may be determined (set) as 0s. The outside of the low-frequency transform coefficient region may be referred to as a high-frequency transform coefficient region. In an example, the low-frequency transform coefficient region may be a rectangular region positioned from the top-left of the (transform) block.

That is, high-frequency zeroing may be defined as setting all transform coefficients at a position defined by an x coordinate of w or greater and a y coordinate of h or greater to 0s where the horizontal x coordinate value of the top-left position of the current transform block (TB) is set to 0 and the vertical y coordinate value thereof is set to 0 (and where x coordinates increase from left to right and y coordinates increase downwards).

In the present disclosure, a specific term or expression for defining specific information or concept is used. For example, as described above, in the present specification, a process of zeroing transform coefficients corresponding to a frequency of a certain value or greater in a (transform) block having a first width (or length) of W1 and a first height (or length) of H1 is defined as "high-frequency zeroing", a region that has been subjected to zeroing through the high-frequency zeroing is defined as a "high-frequency transform coefficient region", and a region that has not been subjected to the zeroing is defined as a "low-frequency transform coefficient region". To indicate the size of the low-frequency transform coefficient region, a second width (or length) of W2 and a second height (or length) of H2 are used.

However, "high-frequency zeroing" may be replaced by various terms, such as high frequency zeroing, high frequency zeroing-out, high-frequency zeroing-out, high-frequency zero-out, and zero-out, and a "high-frequency transform coefficient region" may be replaced by various terms, such as a high-frequency zeroing-applied region, a high-frequency zeroing region, a high-frequency region, a high-frequency coefficient region, a high-frequency zero-out region, and a zero-out region, and a "low-frequency transform coefficient region" may be replaced by various terms, such as a high-frequency zeroing-unapplied region, a low-frequency region, a low-frequency coefficient region, and a restricted region. Thus, a specific term or expression used herein to define specific information or concept needs to be interpreted throughout the specification in view of various operations, functions, and effects according to content indicated by the term without being limited to the designation.

Alternatively, according to an example, a low-frequency transform coefficient region refers to a region remaining after performing high-frequency zeroing or a region in which a significant transform coefficient is left, that is, a region in which a non-zero transform coefficient may exist, and may be referred to as a zero-out region or a zero-out block.

According to an example, when the flag value indicating whether the MTS is applied is 1, that is, when a different transform (DST-7 or DCT-8) other than DCT2 is applicable for the horizontal direction and the vertical direction, transform coefficients may be left only in a top-left region and the remaining region may be zeroed out as follows (zero-out embodiment 2).

When the width (w) is equal to or greater than $2^n$, only transform coefficients corresponding to a length of $w/2^p$ from the left may be left and remaining transform coefficients may be fixed to 0s (zeroed out).

When the height (h) is equal to or greater than $2^m$, only transform coefficients corresponding to a length of $h/2^q$ from the top and remaining transform coefficients may be fixed to 0s (zeroed out).

Here, m, n, p, and q may be integers equal to or greater than 0, and may be specifically as follows.

1) (m, n, p, q)=(5, 5, 1, 1)
2) (m, n, p, q)=(4, 4, 1, 1)

In configuration 1), transform coefficients remain only in a top-left 16×16 region in a 32×16 TU, and transform coefficients remain only in a top-left 8×16 region in an 8×32 TU.

This zero-out method may be applied only to a residual signal to which intra prediction is applied or may be applied only to a residual signal to which inter prediction is applied. Alternatively, the zero-out method may be applied to both a residual signal to which intra prediction is applied and a residual signal to which inter prediction is applied.

Alternatively, according to another example, when the flag value indicating whether the MTS is applied is 1, that is, when a different transform (DST-7 or DCT-8) other than DCT2 is applicable for the horizontal direction and the vertical direction, transform coefficients may be left only in a top-left region and the remaining region may be zeroed out as follows (zero-out embodiment 3).

When the height (h) is equal to or greater than the width (w) and is equal to or greater than $2^n$, only transform coefficients in a top-left w×(h/$2^p$) region may be left and remaining transform coefficients may be fixed to 0s (zeroed out).

When the width (w) is greater than the height (h) and is equal to or greater than $2^m$, only transform coefficients in a top-left (w/$2^q$)×h region and remaining transform coefficients may be fixed to 0s (zeroed out).

In the above conditions, when the height (h) and the width (w) are the same, a vertical length is reduced (h/2p), but a horizontal length may be reduced (w/2q).

Here, m, n, p, and q may be integers equal to or greater than 0, and may be specifically as follows.

1) (m, n, p, q)=(4, 4, 1, 1)
2) (m, n, p, q)=(5, 5, 1, 1)

In configuration 1), transform coefficients remain only in a top-left 16×16 region in a 32×16 TU, and transform coefficients remain only in a top-left 8×8 region in an 8×16 TU.

This zero-out method may be applied only to a residual signal to which intra prediction is applied or may be applied only to a residual signal to which inter prediction is applied. Alternatively, the zero-out method may be applied to both a residual signal to which intra prediction is applied and a residual signal to which inter prediction is applied.

In the foregoing embodiments, a transform coefficient region is limited depending on where the flag value indicating whether the MTS is applied is 0 or where the flag value indicating whether the MTS is applied is 1. According to one example, combinations of these embodiments are possible.

1) Zero-out embodiment 1+zero-out embodiment 2
2) Zero-out embodiment 1+zero-out embodiment 3

As mentioned in zero-out embodiment 2 and zero-out embodiment 3, the zero-out method may be applied only to a residual signal to which intra prediction is applied or may be applied only to a residual signal to which inter prediction is applied. Alternatively, the zero-out method may be applied to both a residual signal to which intra prediction is applied and a residual signal to which inter prediction is applied. Therefore, when an MTS flag is 1, the following table may be configured (when the MTS flag is 1, zero-out embodiment 1 may be applied). Here, the MTS flag may also be configured as an MTS index indicating a transform kernel for the MTS. For example, an MTS index of 0 may indicate that zero-out embodiment 1 is applied.

TABLE 4

| Config. index | Intra prediction residual signals | Inter prediction residual signals |
|---|---|---|
| 1 | Zero-out is not applied | Zero-out is not applied |
| 2 | Zero-out is not applied | Zero out embodiment 2 |
| 3 | Zero-out is not applied | Zero out embodiment 3 |
| 4 | Zero out embodiment 2 | Zero-out is not applied |
| 5 | Zero out embodiment 2 | Zero out embodiment 2 |
| 6 | Zero out embodiment 2 | Zero out embodiment 3 |
| 7 | Zero out embodiment 3 | Zero-out is not applied |
| 8 | Zero out embodiment 3 | Zero out embodiment 2 |
| 9 | Zero out embodiment 3 | Zero out embodiment 3 |

In zero-out embodiment 1, zero-out embodiment 2, and zero-out embodiment 3, a region inevitably including a value of 0 in a TU is clearly defined. That is, a region other than a top-left region, in which a transform coefficient is allowed to exist, is zeroed out. Accordingly, according to an embodiment, it may be configured to bypass a region in which a transform coefficient definitely has a value of 0 as a result of entropy coding of a residual signal, rather than performing residual coding thereon. For example, the following configuration is possible.

1) In HEVC or VVC, a flag indicating whether a non-zero transform coefficient exists in one coefficient group (CG, which may be a 4×4 or 2×2 block depending on the shapes of a subblock and a TU block and a luma component/chroma component) is coded (subblock_flag). Only when subblock_flag is 1, the inside of the CG is scanned and coefficient level values are coded. Accordingly, for CGs belonging to a region that zero-out is performed, subblock_flag may be set to a value of 0 by default rather than being coded.

2) In HEVC or VVC, the position of the last coefficient (last_coefficient_position_x in an X direction and last_coefficient_position_y in a Y direction) in a forward scan order is coded first. Generally, last_coefficient_position_x and last_coefficient_position_y may have a maximum value of (width of a TU−1) and a maximum value of (height of the TU−1), respectively. However, when a region in which a non-zero coefficient may exist is limited due to zero-out, the maximum values of last_coefficient_position_x and last_coefficient_position_y are also limited. Accordingly, the maximum values of last_coefficient_position_x and last_coefficient_position_y may be limited in view of zero-out and may then be coded. For example, when a binarization method applied to last_coefficient_position_x and last_coefficient_position_y is truncated unary binarization, the maximum length of a truncated unary code (codeword length that last_coefficient_position_x and last_coefficient_position_y can have) may be reduced based on adjusted maximum values.

As described above, when the zero-out is applied, particularly in a case where the top-left 16×16 region is a low-frequency transform coefficient region (which may be referred to as a 32-point reduced MTS or RMT 32 hereinafter), the zero-out may be applied both when the MTS technique is applied and when 32-point DST-7 or 32-point DCT-8 is applied.

Figure 5:
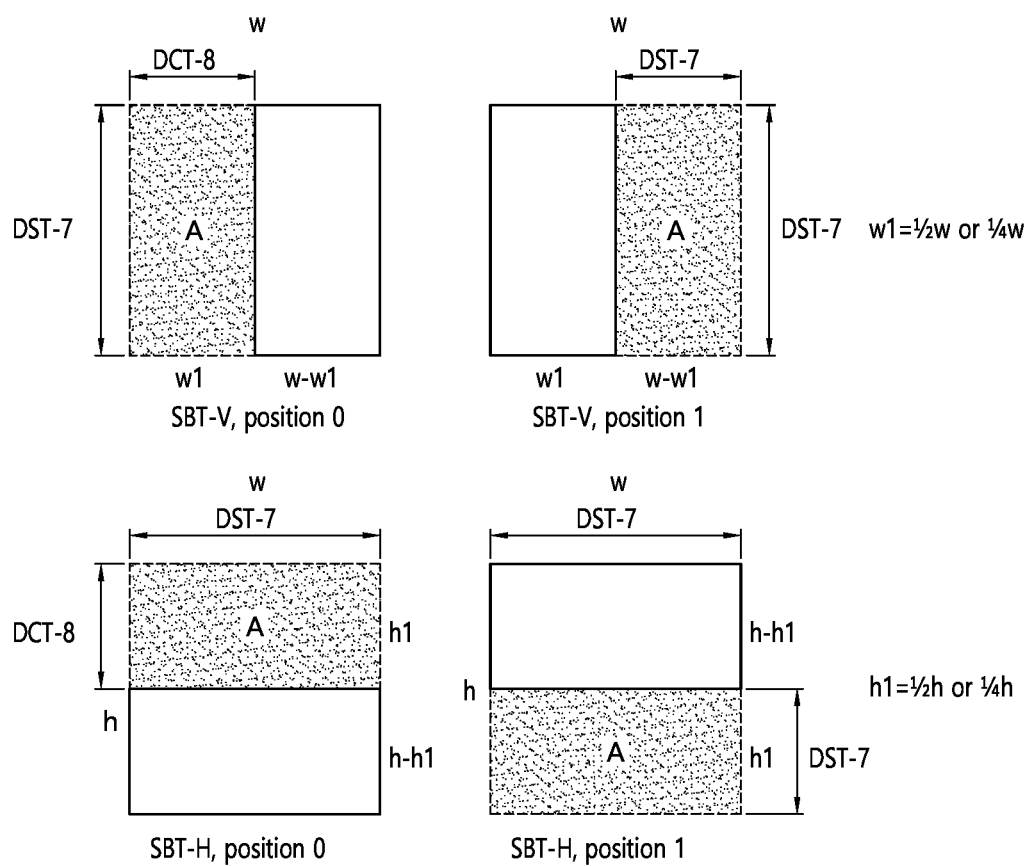
FIG. 5 illustrates an MTS applied to a subblock transform according to an example of the present disclosure.

FIG. 5 illustrates an MTS applied to a subblock transform according to an example of the present disclosure.

According to an example, a subblock transform (SBT) in which a coding unit is partitioned into subblocks and a transform process is performed on the subblocks may be applied. The subblock transform is applied to a residual signal generated through inter prediction, and the residual signal block is partitioned into two partitioned subblocks and a separable transform is applied to only one of the subblocks according to the subblock transform. The subblocks may divide in the horizontal direction or the vertical direction, and the width or height of the partitioned subblocks may be ½ or ¼ of the coding unit. When the subblock transform is applied, since only one of the two partitioned subblocks is transformed, residual data exists only in the transformed subblock and no residual data exists in the remaining one subblock.

When either the width of the subblock to which the transform is applied or the height thereof is 64 or greater, DCT-2 may be applied in both the horizontal direction and the vertical direction, and when both the width of the subblock to which the transform is applied and the height thereof are 32 or less, DST-7 or DCT-8 may be applied. Therefore, when the SBT is applied, a zero-out may be performed by applying RMTS32 only when all of two sides of the subblock to which the transform is applied have a length of 32 or less. That is, DST-7 or DCT-8 with a length of 32 or less may be applied in each direction (horizontal and vertical directions), thereby leaving up to 16 transform coefficients for each row or column.

As shown in FIG. 5, when a block is divided and a transform is applied to region A, DST-7 or DCT-8 may be applied to each side and a transform pair applied in the horizontal and vertical directions is not limited to an example illustrated in FIG. 5. In FIG. 5, the width and height of the entire block are denoted by w and h, respectively, and the width and height of a block to which a separable transform is actually applied are expressed as a pair of (width, height), which is (w1, h) or (w, h1). w1 may be ½ or ¼ of w, and h1 may also be ½ or ¼ of h.

The block to which the transform is applied may be positioned on the left or right or on the top or bottom in the entire block as shown in FIG. 5. Further, the block of FIG. 5 may be a residual signal generated by inter prediction. A flag indicating whether to apply a transform to only one subblock of the residual signal partitioned as shown in FIG. 5 may be signaled, and when the flag is 1, a flag indicating whether the block is vertically partitioned or horizontally partitioned as shown in FIG. 5 may also be set through signaling.

A flag indicating whether block A to which the transform is actually applied is positioned on the left or right in the entire block or a flag indicating whether block A is positioned on the top or bottom may also be signaled.

As illustrated in FIG. 5, when a horizontal transform and a vertical transform are determined for a specific block rather than specifying a horizontal transform and a vertical transform by MTS signaling, RMTS32 proposed above may be applied to each side when the respective sides in the horizontal direction and the vertical direction have a length of 32. In RMTS32, residual coding may be omitted for a zero-out region, or residual coding may be performed by scanning only a non-zero-out region.

FIG. 6 illustrates a 32-point zero-out applied to a subblock transform according to an example of the present disclosure.

When RMTS32 is applied to a subblock partitioned as shown in FIG. 5, residual data may exist as shown in FIG. 6 after the transform. That is, FIG. 6 shows that RMTS32 is applied to the subblock on which the transform is performed among the blocks partitioned according to application of the subblock transform.

The width and height of block A to which the transform is actually applied may be w/2 and h/2 or w/4 and h/4, respectively, relative to the width w and the height h of the original transform block.

In summary, RMTS32 may be applied to any block to which the transform is applied if DST-7 or DCT-8 having a length of 32 is applicable in each of the horizontal and vertical directions. Whether DST-7 or DCT-8 having a length of 32 is applied may be determined through preset signaling or may be determined without signaling according to a predetermined coding condition.

In a case where the MTS is disabled (e.g., in VVC, the MTS may be disabled when "sps_mts_enable_flag" is set to 0 in a sequence parameter set), when the SBT is applied, DCT-2 is applied in both the horizontal direction and the vertical direction rather than a combination of DST-7 and DCT-8 presented in Table 3.

Therefore, when the MTS is disabled, even though the block to be transformed is partitioned into subblocks, RMTS32 needs to be prevented from being applied. As described above, when the MTS is not applied, DCT-2 rather than DST-7 or DCT-8 may be applied in a primary transform, and a top-left block in which a non-zero transform coefficient to which DCT-2 is applied may exist may be subjected to high-frequency zeroing-out of reducing the width and height to 32. That is, the top-left block in which the non-zero transform coefficient to which inverse DCT-2 is applied may exist may be reduced in width and height to 32 but is not zeroed out to a width and height of less than 32. This is to prevent data loss due to the zero-out, and the width or height of the top-left block to which inverse DCT-2 is applied is not reduced to 16.

If the MTS is disabled, it is necessary to explicitly check the width or height of the partitioned subblock to which DCT-2 is applied so that the width or height of the partitioned subblock is not reduced to 16.

According to an example, by determining "sps_mts_enabled_flag" in residual coding syntax, it may be configured not to perform a zero-out due to RMTS32 when the SBT is applied.

Specification text in which the foregoing embodiments are reflected may be shown in the following tables (Table 5 to Table 15).

TABLE 5

7 Syntax and semantics
. . .
7.3 Syntax in tabular form
. . .
7.3.2 Raw byte sequence payloads, trailing bits and byte alignment syntax
. . .
7.3.2.3 Sequence parameter set RBSP syntax

| seq_parameter_set_rbsp( ) { | Descriptor |
|---|---|
| . . . | u(1) |
| sps_transform_skip_enabled_flag | u(1) |
| . . . . | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| . . . | |
| } | |

TABLE 6

7.4 Semantics
. . .
7.4.3 Raw byte sequence payloads, trailing bits and byte alignment semantics
. . .
7.4.3.3 Sequence parameter set RBSP semantics
. . .
sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax
. . .
sps_mts_enabled_flag equal to 1 specifies that sps_explicit_mts_intra_enabled_flag is present in the sequence parameter set RBSP syntax and that
sps_explicit_mts_inter_enabled_flag is present in the sequence parameter set RBSP syntax.
sps_mts_enabled_flag equal to 0 specifies that sps_explicit_mts_intra_enabled_flag is not present in the sequence parameter set RBSP syntaxand that
sps_explicit_mts_inter_enabled_flag is not present in the sequence parameter set RBSP syntax.
sps_explicit_mts_intra_enabled_flag equal to 1 specifies that tu_mts_idx may be present in the transform unit syntax for intra coding units. sps_explicit_mts_intra_enabled_flag equal to 0 specifies that tu_mts_idx is not present in the transform unit syntax for intra coding units. When not present, the value of sps_explicit_mts_intra_enabled_flag is inferred to be equal to 0.
sps_explicit_mts_inter_enabled_flag equal to 1 specifies that tu_mts_idx may be present in the transform unit syntax for inter coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.
sps_sbt_enabled_flag equal to 0 specifies that subblock transform for inter-predicted CUs is disabled. sps_sbt_enabled_flag equal to 1 specifies that subblock transform for inter-predicteds CU is enabled.

TABLE 6-continued sps_sbt_max_size_64_flag equal to 0 specifies that the maximum CU width and height for
allowing subblock transform is 32 luma samples. sps_sbt_max_size_64_flag equal to 1
specifies that the maximum CU width and height for allowing subblock transform is 64 luma
samples.
MaxSbtSize = Min( MaxTbSizeY, sps_sbt_max_size_64_flag ? 64: 32) (7-32)

Table 5 and Table 6 include image information signaled in a sequence parameter set for image coding and include pieces of flag information related to a transform.

sps_transform_skip_enabled_flag specifies whether a transform skip is applied, that is, whether a transform skip flag (transform_skip_flag) may be present in transform unit syntax.

sps_mts_enabled_flag is flag information specifying whether an MTS, that is, a multiple transform selection technique, may be explicitly used. sps_mts_enabled_flag equal to 1 specifies that sps_explicit_mts_intra_enabled_flag and sps_explicit_mts_inter_enabled_flag are present in sequence parameter set syntax.

When either one of sps_explicit_mts_intra_enabled_flag and sps_explicit_mts_inter_enabled_flag is 1, it is specified that the MTS may be applied to the transform unit, which means that tu_mts_idx may exist in the transformation unit syntax. For example, when sps_mts_enabled_flag is equal to 1 and sps_explicit_mts_intra_enabled_flag is equal to 0, an implicit MTS may be applied to an intra coding unit.

sps_sbt_enabled_flag is flag information specifying whether the foregoing subblock transform may be applied to a coding unit for inter prediction.

When sps_sbt_enabled_flag is equal to 1, sps_sbt_max_size_64_flag for the maximum width and height of a coding unit for allowing the subblock transform may be signaled.

When sps_sbt_max_size_64_lag is equal to 0, and the maximum width and height of a coding unit for allowing a block transform is 32, and when sps_sbt_max_size_64_flag is equal to 1, the maximum width and height of the coding unit for allowing the subblock transform is derived to be equal to 64.

TABLE 7

| 7.3.2.4 Picture parameter set RBSP syntax pic_parameter_set_rbsp( ) { | Descriptor |
|---|---|
| . . . | se(v) |
| if( sps_transform_skip_enabled_flag ) | |
| log2_transform_skip_max_size_minus2 | ue(v) |
| . . . | |
| } | |
| 7.4.3.4 Picture parameter set RBSP semantics | |
| . . . log2_transform_skip_max_size_minus2 specifies the maximum block size used for transform skip, and shall be in the range of 0 to 3. When not present, the value of log2_transform_skip_max_size_minus2 is inferred to be equal to 0. The variable MaxTsSize is set equal to 1 << ( log2_transform_skip_ max_size_minus2 + 2 ). | |

Table 7 shows transform-related information signaled in a picture parameter set. log2_transform_skip_max_size_minus2 is information for deriving a maximum block size used for a transform skip, and the maximum block size used for the transform skip is derived to a value of log2_transform_skip_max_size_minus2 plus 2 to the power of 2 (1<< (log2_transform_skip_max_size_minus2+2).

TABLE 8

| 7.3.8.5 Coding unit syntax coding_unit( x0, y0, cbWidth, cbHeight, treeType ) { | Descriptor |
|---|---|
| . . . | |
|   if( CuPredMode[ chType ][ x0 ][ y0 ] != MODE_INTRA && !pred_mode_plt_flag && | |
|     general_merge_flag[x0][y0] == 0) | |
|     cu_cbf | ae(v) |
|   if( cu_cbf ) { | |
|     if( CuPredMode[ chType ][ x0 ][ y0 ] = = MODE_INTER && sps_sbt_enabled_flag | |
|       && !ciip_flag[ x0 ][ y0 ] && !MergeTriangleFlag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth >= 16 | |
|         allowSbtHorH = cbHeight >= 8 | |
|         allowSbtHorQ = cbHeight >= 16 | |
|         if( allowSbtVerH | | allowSbtHorH || allowSbtVerQ | | allowSbtHorQ ) | |
|           cu_sbt_flag | ae(v) |
|       } | |
|       if( cu_sbt_flag ) { | |
|         if( ( allowSbtVerH | | allowSbtHorH ) && ( allowSbtVerQ | | allowSbtHorQ) ) | |
|           cu_sbt_quad_flag | ae(v) |
|         if( (cu_sbt_quad_flag & & allowSbtVerQ && allowSbtHorQ ) | | ( !cu_sbt_quad_flag && allowSbtVerH && allowSbtHorH ) ) | |
|           cu_sbt_horizontal_flag | |

TABLE 8-continued 7.3.8.5 Coding unit syntax
coding_unit( x0, y0, cbWidth, cbHeight, treeType ) {                                     Descriptor

```
        cu_sbt_pos_flag                                                                    ae(v)
    }
  }
  LfnstDcOnly = 1
  LfnstZeroOutSigCoeffFlag = 1
  transform_tree( x0, y0, cbWidth, cbHeight, treeType )
  lfnstWidth = ( treeType = = DUAL_TREE_CHROMA ) ?
cbWidth / SubWidthC
                : cbWidth
  lfnstHeight = ( treeType = = DUAL_TREE_CHROMA) ?
cbHeight / SubHeightC
                : cbHeight
  if( Min( lfnstWidth, lfnstHeight ) >= 4
&&sps_lfnst_enabled_flag = = 1&&
    CuPredMode[ ch Type ][ x0 ][ y0 ] = = MODE_INTRA &&
    IntraSubPartitionsSplitType == ISP_NO_SPLIT &&
    ( !intra_mip_flag[ x0 ][ y0] | | Min( lfnstWidth, lfnstHeight )
>= 16) &&
    tu_mts_idx[ x0 ][ y0 ] = = 0 && Max( cbWidth, cbHeight )
<= Max TbSizeY) {
    if( LfnstDcOnly = = 0 &&LfnstZeroOutSigCoeffFlag = =
1 )
      lfnst_idx[ x0 ][ y0 ]                                                                ae(v)
  }
}
```

TABLE 9

7.4.9 Slice data semantics
...
7.4.9.5 Coding unit semantics
...
cu_sbt_flag equal to 1 specifies that for the current coding unit, subblock transform is used.
cu_sbt_flag equal to 0 specifies that for the current coding unit, subblock transform is not used.
When cu_sbt_flag is not present, its value is inferred to be equal to 0.
   NOTE - : When subblock transform is used, a coding unit is split into two transform units;
   one transform unit has residual data, the other does not have residual data.
cu_sbt_quad_flag equal to 1 specifies that for the current coding unit, the subblock transform
includes a transform unit of ¼ size of the current coding unit. cu_sbt_quad_flag equal to 0
specifies that for the current coding unit the subblock transform includes a transform unit of
½ size of the current coding unit.
When cu_sbt_quad_flag is not present, its value is inferred to be equal to 0.
cu_sbt_horizontal_flag equal to 1 specifies that the current coding unit is split horizontally
into 2 transform units. cu_sbt_horizontal_flag[ x0 ][ y0 ] equal to 0 specifies that the current
coding unit is split vertically into 2 transform units.
When cu_sbt_horizontal_flag is not present, its value is derived as follows:
- If cu_sbt_quad_flag is equal to 1, cu_sbt_horizontal_flag is set to be equal to allowSbtHorQ.
- Otherwise (cu_sbt_quad_flag is equal to 0), cu_sbt_horizontal_flag is set to be equal to
allowSbtHorH.
cu_sbt_pos_flag equal to 1 specifies that the tu_cbf_luma, tu_cbf_cb and tu_cbf_cr of the
first transform unit in the current coding unit are not present in the bitstream. cu_sbt_pos_flag
equal to 0 specifies that the tu_cbf_luma, tu_cbf_cb and tu_cbf_cr of the second transform
unit in the current coding unit are not present in the bitstream.
The variable SbtNumFourthsTb0 is derived as follows:
     sbtMinNumFourths = cu_sbt_quad_flag ? 1 : 2    (7-151)
     SbtNumFourthsTb0 = cu_sbt_pos_flag ? ( 4 - sbtMinNumFourths ) :
     sbtMinNumFourths     (7-152)

Table 8 and Table 9 show syntax and semantics for the coding unit to which inter prediction is applied, and a partition shape to which the SBT is applied may be determined by four syntax elements of Table 8.

cu_sbt_flag specifies whether the SBT is applied to the coding unit, and cu_sbt_quad_flag is flag information specifying whether a block to which the transform is applied is ¼ of the entire block when one coding unit is partitioned into two partitioned blocks. When cu_sbt_quad_flag is equal to 0, the partitioned subblock has a size of ½ of the width or height of the coding unit, and when cu_sbt_quad_flag is equal to 1, the partitioned subblock has a size of ¼ of the width or height of the coding unit. When the width of the coding unit is w and the height thereof is h, the height of the partitioned block may be h1=(¼)×h or the width thereof may be w1=(¼)×w.

cu_sbt_horizontal_flag equal to 1 specifies that the coding unit is partitioned widthwise, that is, in the horizontal direction, and cu_sbt_horizontal_flag equal to 0 specifies that the coding unit is partitioned lengthwise, that is, in the vertical direction.

When cu_sbt_pos_flag value is equal to 0, the transform is applied to the upper subblock among the subblocks partitioned in the horizontal direction, and the transform is applied to the left subblock among the subblocks partitioned in the vertical direction. When cu_sbt_pos_flag value is equal to 1, the transform is applied to the lower subblock among the subblocks partitioned in the horizontal direction, and the transform is applied to the right subblock among the subblocks partitioned in the vertical direction.

The following table shows trTypeHor and trTypeVer according to cu_sbt_horizontal_flag and cu_sbt_pos_flag.

TABLE 10

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

As described above, when trTypeHor denotes a horizontal transform kernel and trTypeVer denotes a horizontal transform kernel, a trTypeHor or trTypeVer value of 0 may be set for DCT-2, a trTypeHor or trTypeVer value of 1 may be set for DST-7, and a trTypeHor or trTypeVer value of 2 may be set for DCT-8. Therefore, when the length of at least one side of the partitioned block to which the transform is applied is 64 or greater, DCT-2 may be applied in both the horizontal direction and the vertical direction; otherwise, DST-7 or DCT-8 may be applied. When the current block is partitioned and the transform is performed on the subblock, the MTS may be implicitly applied as shown in Table 10.

When both the width and the height of the subblock are 32 or less and thus DST-7 or DCT-8 is applied, that is, when the MTS is applied to the subblock, the foregoing RMTS may be applied. For example, the length of the subblock in each direction is 32, only 16 transform coefficients may be left by applying DST-7 or DCT-8 with a length of 32.

However, when either the width or the height of the subblock is 64 or greater, DCT-2 may be applied in both the horizontal direction and the vertical direction, and only 32 transform coefficients may be left according to a high-frequency zero-out rather than applying the RMTS in each direction.

TABLE 11

| 7.3.8.10 Transform unit syntax<br>transform_unit( x0, y0, tbWidth, tbHeight, treeType, subTuIndex, chType ) | Descriptor |
|---|---|
| {<br> . . .<br>  if( tu_cbf_luma[ x0 ][ y0 ] && treeType !=<br>DUAL_TREE_CHROMA<br>      && (tbWidth <= 32 ) && ( tbHeight <= 32 )<br>      && ( IntraSubPartitionsSplit[ x0 ][ y0 ] = = ISP_NO_SPLIT )<br>&& ( !cu_sbt_flag ) ) {<br>    if( sps_transform_skip_enabled_flag && !BdpcmFlag[ x0 ][ y0<br>]&&<br>      tbWidth <= MaxTsSize && tbHeight <= MaxTsSize )<br>      transform_skip_flag[ x0 ][ y0 ] | |
| | ae(v) |
|     if( ( ( CuPredMode[ chType ][ x0 ][ y0 ] = = MODE_INTER &&<br>      sps_explicit_mts_inter_enabled_flag )<br>      \| \|( CuPredMode[ chType ][ x0 ][ y0 ] = = MODE_INTRA &&<br>      sps_explicit_mts_intra_enabled_flag ) )&& (<br>!transform_skip_flag[ x0 ][ y0 ] ) )<br>      tu_mts_idx[ x0 ][ y0 ] | |
| | ae(v) |
|     }<br>  if( tu_cbf_luma[ x0 ][ y0 ] ) {<br>    if( !transform_skip_flag[ x0 ][ y0 ] )<br>      residual_coding( x0, y0, Log2( tbWidth ), Log2( tbHeight ), 0 )<br>    else<br>      residual_ts_coding( x0, y0, Log2( tbWidth ), Log2( tbHeight ),0 )<br>  }<br>  if( tu_cbf_cb[ x0 ][ y0 ] )<br>    residual_coding( xC, yC, Log2( wC ), Log2( hC ), 1 )<br>  if( tu_cbf_cr[ x0 ][ y0 ]&&<br>    !( tu_cbf_cb[ x0 ][ y0 ] &&<br>tu_joint_cbcr_residual_flag[ x0 ][ y0 ] )) {<br>    residual_coding( xC, yC, Log2( wC ), Log2( hC ), 2 )<br>    }<br>}| |
| 7.4.9.10 Transform unit semantics | |
| . . .<br>transform_skip_flag[ x0 ][ y0 ] specifies whether a transform is applied to the luma<br>transform block or not. The array indices x0, y0 specify the location ( x0, y0 ) of the top-<br>left luma sample of the considered transform block relative to the top-left luma sample of<br>the picture. transform_skip_flag[ x0 ][ y0 ] equal to 1 specifies that no transform is applied<br>to the luma transform block. transform_skip_flag[ x0 ][ y0 ] equal to 0 specifies that the<br>decision whether transform is applied to the luma transform block or not depends on other<br>syntax elements.<br>When transform_skip_flag[ x0 ][ y0 ] is not present, it is inferred as follows:<br>- If BdcpmFlag[ x0 ][ x0 ] is equal to 1, transform_skip_flag[ x0 ][ y0 ] is inferred to be<br>  equal to 1.<br>- Otherwise (BdcpmFlag[ x0 ][ x0 ] is equal to 0), transform_skip_flag[ x0 ][ y0 ] is<br>  inferred to be equal to 0.<br>tu_mts_idx[ x0 ][ y0 ] specifies which transform kernels are applied to the residual<br>samples along the horizontal and vertical direction of the associated luma transform block. | |

TABLE 11-continued

The array indices x0, y0 specify the location ( x0, y0 ) of the top-left luma sample of the considered transform block relative to the top-left luma sample of the picture.
When tu_mts_idx[ x0 ][ y0 ] is not present, it is inferred to be equal to 0.

Table 11 shows part of syntax and semantics of a transform unit according to an example. tu_mts_idx[x0][y0] specifies an MTS index applied to a transform block, and trTypeHor and trTypeVer may be determined according to the MTS index as shown in Table 1.

According to another example, mts_idx may be signaled in a coding unit level rather than in a transform unit level.

order in the transform block, last_sig_coeff_y_prefix specifies a prefix of a row position of the last significant coefficient in the scan order in the transform block, last_sig_coeff_x_suffix specifies a suffix of the column position of the last significant coefficient in the scan order in the transform block, and last_sig_coeff_y_suffix specifies a suffix of the row position of the last significant coefficient in the scan

TABLE 12

| 7.3.8.11 Residual coding syntax | |
|---|---|
| residual_coding( x0, y0, log2TbWidth, log2TbHeight, cIdx ) { | Descriptor |
| if( ( tu_mts_idx[ x0 ][ y0 ] > 01 \| \| <br> ( cu_sbt_flag && log2TbWidth < 6 && log2TbHeight < 6 ) ) <br> && cIdx = = 0 && log2TbWidth > 4 &&sps_mts_enabled_flag ) <br>  log2ZoTbWidth = 4 <br> else <br>  log2ZoTbWidth = Min( log2TbWidth, 5 ) <br> MaxCcbs = 2 * ( 1 << log2TbWidth ) * ( 1 << log2TbHeight ) <br> if( ( tu_mts_idx[ x0 ][ y0 ] > 0 \|\| ( cu_sbt_flag && log2TbWidth < 6 <br>  && log2TbHeight < 6 ) ) <br>  && cIdx = = 0 & & log2TbHeight > 4 <br>  &&sps_mts_enabled_flag ) <br>  log2ZoTbHeight = 4 <br> else <br>  log2ZoTbHeight = Min( log2TbHeight, 5 ) <br> if( log2TbWidth > 0 ) | |
|  last_sig_coeff_x_prefix | ae(v) |
| if( log2TbHeight > 0 ) | |
|  last_sig_coeff_y_prefix | ae(v) |
| if( last_sig_coeff_x_prefix > 3 ) | |
|  last_sig_coeff_x_suffix | ae(v) |
| if( last_sig_coeff_y_prefix > 3 ) | |
|  last_sig_coeff_y_suffix | ae(v) |
| log2TbWidth = log2ZoTbWidth <br> log2TbHeight = log2ZoTbHeight | |
| 7.4.9.11 Residual coding semantic | |
| ... <br> last_sig_coeff_x_prefix specifies the prefix of the column position of the last significant <br> coefficient in scanning order within a transform block. The values of <br> last_sig_coeff_x_prefix shall be in the range of 0 to ( log2ZoTbWidth << 1) − 1, <br> inclusive. <br> When last_sig_coeff_x_prefix is not present, it is inferred to be 0. <br> last_sig_coeff_y_prefix specifies the prefix of the row position of the last significant <br> coefficient in scanning order within a transform block. The values of <br> last_sig_coeff_y_prefix shall be in the range of 0 to ( log2ZoTbHeight << 1) − 1, <br> inclusive. <br> When last_sig_coeff_y_prefix is not present, it is inferred to be 0. <br> last_sig_coeff_x_prefix specifies the prefix of the column position of the last significant <br> coefficient in scanning order within a transform block. The values of <br> last_sig_coeff_x_prefix shall be in the range of 0 to ( log2TbWidth << 1) − 1, <br> inclusive. <br> When last_sig_coeff_x_prefix is not present, it is inferred to be 0. <br> last_sig_coeff_y_prefix specifies the prefix of the row position of the last significant <br> coefficient in scanning order within a transform block. The values of <br> last_sig_coeff_y_prefix shall be in the range of 0 to ( log2TbHeight << 1) − 1, <br> inclusive. <br> When last_sig_coeff_y_prefix is not present, it is inferred to be 0. | |

Table 12 shows part of syntax and semantics of residual coding according to an example.

Syntax elements last_sig_coeff_x_prefix, last_sig_coeff_y_prefix, last_sig_coeff_x_suffix, and last_sig_coeff_y_suffix in Table 12 specify (x, y) position information on the last non-zero transform coefficient in a transform block. Specifically, last_sig_coeff_x_prefix specifies a prefix of a column position of the last significant coefficient in a scan order in the transform block. Here, the significant coefficient may refer to the non-zero coefficient. Further, the scan order may be a right upward diagonal scan order. Alternatively, the scan order may be a horizontal scan order or a vertical scan order. The scan order may be determined based on whether inter/inter prediction is applied to a target block (CB or CB including a TB) and/or a specific intra/inter prediction mode.

A zero-out region may be configured in the residual coding of Table 12 based on tu_mts_idx[x0][y0] of Table 11.

Further, when cu_sbt_flag is equal to 1, the height of the block to which the transform is applied is 32 or less (log2TbHeight <6), the width thereof is 32 (log2TbWidth <6 && log2TbWidth >4), and sps_mts_enabled_flag is equal to 1, the width of the top-left region in which the non-zero transform coefficient may exist is set to 16 (log2ZoTbWidth=4). Similarly, when cu_sbt_flag is equal to 1, the width of the block to which the transform is applied is 32 or less (log2TbWidth <6), the height thereof is 32 (log2TbHeight <6 && log2TbHeight >4), and sps_mts_enabled_flag is equal to 1, the height of the top-left region in which the non-zero transform coefficient may exist is set to 16 (log2ZoTbHeight=4).

The block to which the transform is applied may be the original transform block or the partitioned subblock.

Here, log2ZoTbWidth and log2ZoTbHeight denote the maximum width and maximum height of the top-left region in the transform block in which the non-zero coefficient may exist, and the top-left region may be referred to as a "reduced transform block". That is, log2ZoTbWidth and log2ZoTbHeight may be defined as variables indicating the width and height of the reduced transform block.

That is, according to an example, when the subblock transform is applied to the coding unit, the MTS needs to be applicable in order to apply a zero-out (RMTS) in which the width of the top-left block in which the non-zero coefficient may exist is reduced to 16 and the remaining region is 0.

When the MTS is not applied, even though it is identified that the SBT is applied to the coding unit (when cu_sbt_flag is 1), DCT-2 rather than the MTS needs to be applied to the subblock to which the transform is applied. For example, when sps_mts_enabled_flag is equal to 0, even though the SBT is applied to the coding block, DCT-2 rather than DST-7 or DCT-8 is applied.

In addition, when the SBT is applied to the coding block, DCT-2 is applied only when the width or height of the subblock is 64 or greater, and DCT-2 is not applied in other cases.

That is, to ensure that DCT-2 is applied to the subblock and to prevent the RMTS that may cause data loss from being applied to the subblock to which DCT-2 is applied, the encoding apparatus configures image information for checking the value of sps_mts_enabled_flag, and the decoding apparatus checks the value of sps_mts_enabled_flag in residual coding according to the configured image information.

In summary, when it is identified only that cu_sbt_flag is 1 in an image decoding process, the value of sps_mts_enabled_flag signaled in the sequence parameter set may be checked when setting a transform block size according to the RMTS in order to prevent the RMTS from being applied to the subblock to which DCT-2 is applied. When cu_sbt_flag is equal to 1 and sps_mts_enabled_flag is equal to 1, the RMTS may be applied, and thus the width and height of the top-left block in which the non-zero transform coefficient may exist may be set to 16, and when cu_sbt_flag is equal to 1 and sps_mts_enabled_flag is equal to 0, the MTS is not applied because DCT-2 is used for the transform, and thus a zero-out according to the RMTS is also not applied. In this case, the width and height of the top-left block in which the non-zero transform coefficient may exist may be set to 32 or less.

For example, in a case of a 32×32 transform block to which the subblock transform is applied, when sps_mts_enabled_flag is equal to 0, DCT-2 is used as a transform kernel, and thus the width or height having a length of 32 is not reduced to 16.

As described above, when the MTS is disabled, it is possible to prevent an RMTS of zeroing-out to a length of 16 by checking sps_mts_enabled_flag.

In other cases, when cu_sbt_flag is not 1, the height of the transform block is greater than 32, the width of the transform block is not 32, or the MTS is not applied, the width of the transform block may be set to a smaller value of the width of the transform block and 32. That is, the maximum width of the transform block may be limited to 32 by the high-frequency zero-out. Further, when cu_sbt_flag is not 1, the width of the transform block is greater than 32, the height of the transform block is not 32, or the MTS is not applied, the height of the transform block may be set to a smaller value of the height of the transform block and 32. That is, the maximum height of the transform block may be limited to 32 by the zero-out.

When the SBT is applied, if the length of at least one side of the partitioned block is 64 or greater, DCT-2 may be applied in both the horizontal direction and the vertical direction. Otherwise, DST-7 or DCT-8 may be applied as shown in Table 10. Accordingly, when the SBT is applied, a zero-out may be performed by applying RMTS32 only when all of two sides of the partitioned block to which the transform is applied have a length of 32 or less. That is, when the length of the block in each direction is 32, DST-7 or DCT-8 with a length of 32 may be applied, thereby leaving only 16 transform coefficients.

As shown in Table 12, when RMTS32 is applied, coding may be performed considering the width and height of the remaining region which is not zeroed-out (low-frequency transform coefficient region) as the width and height of the actual transform block rather than using the width and height of the original transform block for the coding (log2ZoTbWidth=4 or log2ZoTbHeight=4).

For example, in a case where the width×height of the original transform block is 32×16, when RMTS32 is applied, non-zero coefficients exist only in a top-left 16×16 region due to a zero-out. Accordingly, the width and height of the top-left region in which the non-zero transform coefficients may exist are set to 16 and 16, respectively, and then coding of syntax elements (eg, last_sig_coeff_x_prefix and last_sig_coeff_y_prefix) may be performed.

In summary, according to the residual coding in Table 12, log2ZoTbWidth and log2ZoTbHeight indicating the maximum width and the maximum height in which non-zero coefficients may exist are set before coding last_sig_coeff_x_prefix, the position of the last non-zero coefficient is coded by applying log2ZoTbWidth and log2ZoTbHeight, and then the width and height of the actual transform block are changed to log2ZoTbWidth and log2ZoTmHeight, respectively (log2TbWidth=log2ZoTbWidth and log2TbHeight=log2ZoHeight). Subsequently, the syntax elements may be coded according to the changed values. Consequently, the remaining top-left region excluding the zero-out region in the residual coding may be configured as a new transform block, and then residual samples may be derived.

When the size of the transform block is reduced to a low-frequency transform coefficient region by the zero-out of the high-frequency transform coefficients, the values of last_sig_coeff_x_prefix and last_sig_coeff_y_prefix may be limited to a range from 0 to a value between (log2ZoTbWidth <<1)−1 and (log2ZoTbHeight <<1)−1 as shown in the semantics of Table 12.

TABLE 13

8 Decoding process
...
8.7 Scaling, transformation and array construction process
...
8.7.4 Transformation process for scaled transform coefficients
8.7.4.1 General
Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0 ... nTbW − 1, y = 0 .. nTbH − 1.
Output of this process is the (nTbW)x(nTbH) array r[ x ][ y ] of residual samples with x = 0 ... nTbW − 1, y = 0 ... nTbH − 1.
When lfnst_idx[ xTbY ][ yTbY ] is not equal to 0 and both nTbW and nTbH are greater than or equal to 4, the following applies:
- The variables predModeIntra, nLfnstOutSize, log2LfnstSize, nLfnstSize, and nonZeroSize are derived as follows:
    predModeIntra = ( cIdx = = 0) ? IntraPredModeY[ xTbY ][ yTbY ] : IntraPredModeC[ xTbY ][ yTbY ]    (8-965)
    nLfnstOutSize = (nTbW>=8 && nTbH >= 8) ? 48 : 16    (8-966)
    log2LfnstSize = (nTbW >= 8 && nTbH >= 8) ? 3 : 2    (8-967)
    nLfnstSize = 1 << log2LfnstSize    (8-968)
    nonZeroSize = ( (nTbW = = 4 && nTbH = = 4) || (nTbW = = 8 && nTbH = = 8) ) ? 8 : 16 (8-969)
- When intra_mip_flag[ xTbComp ][ yTbComp ] is equal to 1 and cIdx is equal to 0, predModeIntra is setequal to INTRA_PLANAR.
- When predModeIntra is equal to either INTRA_LT_CCLM, INTRA_L_CCLM, or INTRA_T_CCLM, predModeIntra is set equal to IntraPredModeY[ xTbY + nTbW / 2 ][ yTbY + nTbH / 2 ].
- The wide angle intra prediction mode mapping process as specified in clause 8.4.5.2.6 is invoked with predModeIntra, nTbW, nTbH and cIdx as inputs, and the modified predModeIntra as output.
- The values of the list u[ x ] with x = 0 ... nonZeroSize − 1 are derived as follows:
    xC = DiagScanOrder[ 2 ][ 2 ][ x ][ 0 ]    (8-970)
    yC = DiagScanOrder[ 2 ][ 2 ][ x ][ 1 ]    (8-971)
    u[ x ] = d[ xC ][ yC ]    (8-972)
- The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[ x ] with x = 0 ... nonZeroSize − 1, the intra prediction mode for LFNST set selection predModeIntra, and the LFNST index for transform selection in the selected LFNST set lfnst_idx[ xTbY ][ yTbY ] as inputs, and the list v[ x ] with x = 0 ... nLfnstOutSize − 1 as output.
- The array d[ x ][ y ] with x = 0 ... nLfnstSize − 1, y = 0 ... nLfnstSize − 1 is derived as follows:
  - If predModeIntra is less than or equal to 34, the following applies:
    d[ x ][ y ] = (y < 4) ? v[ x + ( y << log2LfnstSize ) ] : ( (x < 4) ? v[32 + x + ( ( y − 4 ) << 2 ) ] : d[ x ][ y ] )    (8-973)
  - Otherwise, the following applies:
    d[ x ][ y ] = ( x < 4 ) ? v[ y + ( x << log2LfnstSize ) ] : ( (y < 4) ? v[ 32 + y + ( ( x − 4 ) << 2 ) ] : d[ x ][ y ] )    (8-974)
The variable implicitMtsEnabled is derived as follows:
- If sps_mts_enabled_flag is equal to 1 and one of the following conditions is true, implicitMtsEnabled is set equal to 1:
  - IntraSubPartitionsSplitType is not equal to ISP_NO_SPLIT
  - cu_sbt_flag is equal to 1 and Max( nTbW, nTbH ) is less than or equal to 32
  - sps_explicit_mts_intra_enabled_flag is equal to 0 and CuPredMode[ 0 ][ xTbY ][ yTbY ] is equal to MODE_INTRA and lfnst_idx[ x0 ][ y0 ] is equal to 0 and intra_mip_flag[ x0 ][ y0 ] is equal to 0
- Otherwise, implicitMtsEnabled is set equal to 0.
    The variable trTypeHor specifying the horizontal transform kernel and the variable trTypeVer specifying the vertical transform kernel are derived as follows:
- If cIdx is greater than 0, trTypeHor and trTypeVer are set equal to 0.
- Otherwise, if implicitMtsEnabled is equal to 1, the following applies:
  - If IntraSubPartitionsSplitType is not equal to ISP_NO_SPLITor sps_explicit_mts_intra_enabled_flag is equal to 0 and CuPredMode[ 0 ][ xTbY ][ yTbY ] is equal to MODE_INTRA, trTypeHor and trTypeVer are derived as follows:
    trTypeHor = ( nTbW >= 4 && nTbW <= 16) ? 1 : 0    (8-975)
    trType Ver = (nTbH >=4 && nTbH <= 16) ? 1 : 0    (8-976)
  - Otherwise (cu_sbt_flag is equal to 1), trTypeHor and trTypeVer are specified in Table 8-15 depending on cu_sbt_horizontal_flag and cu_sbt_pos_flag.

TABLE 13-continued

- Otherwise, trTypeHor and trTypeVer are specified in Table 8-14 depending on
  tu_mts_idx[ xTbY ][ yTbY ].
The variables nonZeroW and nonZeroH are derived as follows:
- If lfnst_idx[ xTbY ][ yTbY ] is not equal to 0 and nTbW is greater than or equal to 4
  and nTbH is greater than or equal to 4, the following applies:
    nonZeroW = ( nTbW == 4 || nTbH == 4) ? 4 : 8    (8-977)
    nonZeroH = ( nTbW == 4 || nTbH == 4) ? 4 : 8    (8-978)
- Otherwise, the following applies:
    nonZeroW = Min( nTbW, ( trTypeHor > 0) ? 16 : 32)    (8-979)
    nonZeroH = Min( nTbH, ( trTypeVer > 0) ? 16 : 32)    (8-980)
    The (nTbW)x(nTbH) array r of residual samples is derived as follows:
1. When nTbH is greater than 1, each (vertical) column of scaled transform coefficients
   d[ x ][ y ] with x = 0 . . . nonZeroW − 1, y = 0 . . . nonZeroH − 1 is transformed to e[ x ][ y ]
   with x = 0 . . . nonZeroW − 1, y = 0 . . . nTbH − 1 by invoking the one-dimensional
   transformation process as specified in clause 8.7.4.4 for each column x = 0 . . . nonZeroW −
   1 with the height of the transform block nTbH, the non-zero height of the scaled
   transform coefficients nonZeroH, the list d[ x ][ y ] with y = 0 . . . nonZeroH − 1 and the
   transform type variable trType set equal to trTypeVer as inputs, and the output is the
   list e[ x ][ y ] with y = 0 . . . nTbH − 1.
2. When nTbH and nTbW are both greater than 1, the intermediate sample values g[ x ][ y ]
   with x = 0 . . . nonZeroW − 1, y = 0 . . . nTbH − 1 are derived as follows:
    g[ x ][ y ] = Clip3( CoeffMin, CoeffMax, ( e[ x ][y] + 64 ) >> 7)    (8-981)
3. When nTbW is greater than 1, each (horizontal) row of the resulting array g[ x ][ y ]
   with x = 0 . . . nonZeroW − 1, y = 0 . . . nTbH − 1 is transformed to r[ x ][ y ] with x = 0 . . . nTbW −
   1, y = 0 . . . nTbH − 1 by invoking the one-dimensional transformation process as
   specified in clause 8.7.4.4 for each row y = 0 . . . nTbH − 1 with the width of the transform
   block nTbW, the non-zero width of the resulting array g[ x ][ y ] nonZeroW, the list
   g[ x ][ y ] with x = 0 . . . nonZeroW − 1 and the transform type variable trType set equal to
   trTypeHor as inputs, and the output is the list r[ x ][ y ] with x = 0 . . . nTbW − 1.
4. When nTbW is equal to 1, r[ x ][ y ] is set equal to e[ x ][ y ] for x = 0 . . . nTbW − 1, y =
   0 . . . nTbH − 1.

Table 13 illustrates a transform process, which shows that the MTS is implicitly applied when the SBT is applied to the coding unit (cu_sbt_flag is equal to 1 and Max(nTbW, nTbH) is less than or equal to 32, implicitMtsEnabled is set equal to 1).

The variable trTypeHor denoting the horizontal transform kernel and the variable trTypeVer denoting the vertical transform kernel may be derived based on Table 8-14, and Table 8-14 of Table 13 may correspond to Table 1 of this document.

In addition, when the SBT is applied to the coding unit, the variables trTypeHor and trTypeVer may be derived based on Table 8-15, and Table 8-15 of Table 13 may correspond to Table 10 of this document.

The size of the block to which the zero-out is applied, that is, the zero-out block, illustrated in Table 12 is expressed as nonZeroW and nonZeroH in Table 13. nonZeroW and nonZeroH may be defined as variables denoting the width and height of the top-left block in which a non-zero transform coefficient may exist.

When no LFNST is applied, nonZeroW may be set to a smaller value of a value based on whether trTypeHor is greater than 0 ((trTypeHor >0) ? 16:32) and the width (nTbW) of the transform block (nonZeroW=Min (nTbW, (trTypeHor >0) ? 16:32)). When trTypeHor is greater than 0, since the MTS is applied, "(trTypeHor >0) ? 16:32" is set to 16, and thus nonZeroW is set to a smaller value of the width (nTbW) of the transform block and 16. However, when trTypeHor is not greater than 0, since the MTS is not applied, "(trTypeHor >0) ? 16:32" is set to 32, and thus nonZeroW is set to a smaller value of the width (nTbW) of the transform block and 32.

Similarly, when no LFNST is applied, nonZeroH may be set to a smaller value of a value based on whether trTypeVer is greater than 0 ((trTypeVer >0) ? 16:32) and the width (nTbH) of the transform block (nonZeroH=Min(nTbH, (trTypeVer >0) ? 16:32)). When trTypeVer is greater than 0, since the MTS is applied, "(trTypeVer >0) ? 16:32" is set to 16, and accordingly nonZeroH is set to a smaller value of the height (nTbH) of the transform block and 16. However, when trTypeVer is not greater than 0, since the MTS is not applied, "(trTypeVer >0) ? 16:32" is set to 32, and thus nonZeroH is set to a smaller value of the height (nTbH) of the transform block and 32.

That is, the size of the zero-out block is set to 16 or 32 depending on whether the MTS is applied, that is, whether trTypeHor and trTypeVer can have a value of 0 or greater.

Residual sample values may be derived based on nonZeroW and nonZeroH set considering the zero out (When nTbH is greater than 1, each (vertical) column of scaled transform coefficients d[x][y] with x=0 . . . nonZeroW−1, y=0 . . . nonZeroH−1 is transformed to e[x][y] with x=0 . . . nonZeroW−1, y=0 . . . nTbH−1 by invoking the one-dimensional transformation process as specified in clause 8.7.4.4 for each column x=0 . . . nonZeroW−1 with the height of the transform block nTbH, the non-zero height of the scaled transform coefficients nonZeroH, the list d[x][y] with y=0 . . . nonZeroH−1 and the transform type variable trType set equal to trTypeVer as inputs, and the output is the list e[x][y] with y=0 . . . nTbH−1).

When the size of the transform block is changed by applying the zero-out, the size of a transform block used for context selection of last_sig_coeff_x_prefix and last sig_coeff_y_prefix may also be changed. Table 14 shows binarization of last_sig_coeff_x_prefix and last sig_coeff_y_prefix considering the reduced transform block, and Table 15 shows a process of deriving ctxInc (context increment) for deriving last_sig_coeff_x_prefix and last sig_coeff_y_prefix. Since context may be selected and distinguished by the context increment, a context model may be derived based on the context increment.

TABLE 14

9 Parsing process
...
9.3 CABAC parsing process for slice data
...
9.3.3 Binarization process
9.3.3.1 General
Input to this process is a request for a syntax element.
Output of this process is the binarization of the syntax element.
Table 9-77 specifies the type of binarization process associated with each syntax element and corresponding inputs.
The specification of the truncated Rice (TR) binarization process, the truncated binary (TB) binarization process, the k-th order Exp-Golomb (EGk) binarization process and the fixed-length (FL) binarization process are given in clauses 9.3.3.3 through 9.3.3.7, respectively.
Table 9-77 - Syntax elements and associated binarizations

| Syntax structure | Syntax element | Binarization | |
|---|---|---|---|
| | | Process | Input parameters |
| ... | ... | ... | ... |
| residual_coding( ) | last_sig_coeff_x_prefix | TR | cMax = ( log2ZoTbWidth << 1 ) − 1, cRiceParam = 0 |
| | last_sig_coeff_y_prefix | TR | cMax = ( log2ZoTbHeight << 1 ) − 1, cRiceParam = 0 |
| | last_sig_coeff_x_suffix | FL | cMax = (1 << ( ( last_sig_coeff_x_prefix >> 1 ) − 1 ) − 1 ) |
| | last_sig_coeff_y_suffix | FL | cMax = (1 << ( ( last_sig_coeff_y_prefix >> 1 ) − 1 ) − 1) |
| ... | ... | ... | ... |

TABLE 15

9.3.4 Decoding process flow
...
9.3.4.2 Derivation process for ctxTable, ctxIdx and bypassFlag
9.3.4.2.1 General
...
9.3.4.2.4 Derivation process of ctxInc for the syntax elements last_sig_coeff_x_prefix and last_sig_coeff_y_prefix
Inputs to this process are the variable binIdx, the colour component index cIdx, the binary logarithm of the transform block width log2TbWidth and the transform block height log2TbHeight.
Output of this process is the variable ctxInc.
The variable log2TbSize is derived as follows:
- If the syntax element to be parsed is last_sig_coeff_x_prefix, log2TbSize is set equal to log2TbWidth.
- Otherwise (the syntax element to be parsed is last_sig_coeff_y_prefix), log2TbSize is set equal to log2TbHeight.
    The variables ctxOffset and ctxShift are derived as follows:
- If cIdx is equal to 0, ctxOffset is set equal to offsetY[ log2TbSize − 2 ] and ctxShift is set equal to ( log2TbSize + 1 ) >> 2 with the list offsetY specified as follows:
    offsetY[ ] = {0, 3, 6, 10, 15}   (9-34)
- Otherwise (cIdx is greater than 0), ctxOffset is set equal to 20 and ctxShift is set equal to Clip3( 0, 2, $2^{log2TbSize}$ >> 3 ).
    The variable ctxInc is derived as follows:
    ctxInc = ( binIdx >> ctxShift ) + ctxOffset
(9-35)

As illustrated in Table 14, the maximum values (cMax) of last_sig_coeff_x_prefix and last_sig_coeff_y_prefix are set based on log2ZoTbWidth and log2ZoTbHeight corresponding to the width and height of the reduced transform block as the low-frequency transform coefficient region (cMax=(log2ZoTbWidth<<1)−1, cMax=(log2ZoTbHeight<<1)−1). When a truncated unary is used for the binarization of last_sig_coeff_x_prefix and last_sig_coeff_y_prefix, the maximum values (cMax) of last_sig_coeff_x_prefix and last_sig_coeff_y_prefix may be set to be equal to the maximum values of codewords used for the binarization of last_sig_coeff_x_prefix and last_sig_coeff_y_prefix. Therefore, the maximum length of a prefix codeword denoting last significant coefficient prefix information may be derived based on the size of the zero-out block.

As illustrated in Table 15, for CABAC context for the two syntax elements, that is, last_sig_coeff_x_prefix and last_sig_coeff_y_prefix, the size of the original transform block (TU) rather than the reduced transform block in the low-frequency transform coefficient region is applied (log2TbSize is set equal to log2TbWidth, log2TbSize is set equal to log2TbHeight).

In summary, according to an example, residual samples may be derived based on the last significant coefficient position information, in which the context model may be derived based on the size of the original transform block of which the size is not changed, and the last significant coefficient position may be derived based on the size of the transform block to which the zero-out has been applied. Here, the size, specifically, the width or height, of the transform block to which the zero-out has been applied, that is, the zero-out block, is smaller than the size, width, or height of the original transform block.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 7:
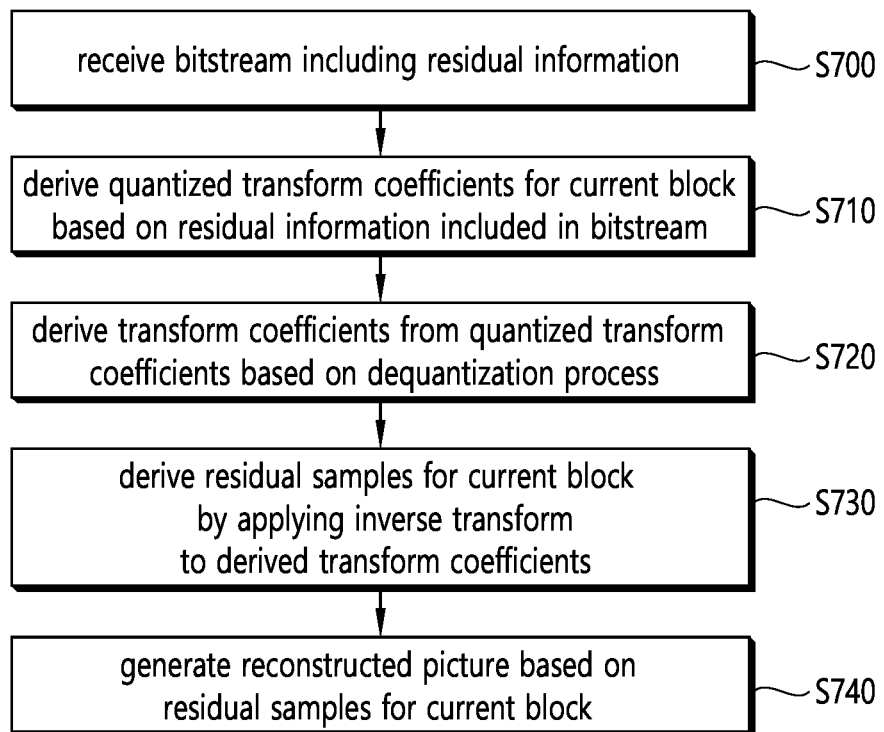
FIG. 7 is a flowchart illustrating the operation of a video decoding apparatus according to an embodiment of the present disclosure.

FIG. 7 is a flowchart illustrating the operation of a video decoding apparatus according to an embodiment of the present disclosure.

Each operation illustrated in FIG. 7 may be performed by the decoding apparatus 300 illustrated in FIG. 3. Specifically, S700 and S710 may be performed by the entropy decoder 310 illustrated in FIG. 3, S720 may be performed by the dequantizer 321 illustrated in FIG. 3, S730 may be performed by the inverse transformer 322 illustrated in FIG. 3, and S740 may be performed by the adder 340 illustrated in FIG. 3. Operations according to S700 to S740 are based on some of the foregoing details explained with reference to FIG. 4 to FIG. 6. Therefore, a description of specific details overlapping with those explained above with reference to FIG. 3 to FIG. 6 will be omitted or will be made briefly.

The decoding apparatus according to an embodiment may receive a bitstream including residual information (S700). Specifically, the entropy decoder 310 of the decoding apparatus may receive the bitstream including the residual information.

The decoding apparatus according to an embodiment may derive quantized transform coefficients for a current block based on the residual information included in the bitstream (S710). Specifically, the entropy decoder 310 of the decoding apparatus may the quantized transform coefficients for the current block based on the residual information included in the bitstream.

The decoding apparatus according to an embodiment may derive transform coefficients from the quantized transform coefficients based on a dequantization process (S720). Specifically, the dequantizer 321 of the decoding apparatus may derive the transform coefficients from the quantized transform coefficients based on the dequantization process.

The decoding apparatus according to an embodiment may derive residual samples for the current block by applying inverse transform to the derived transform coefficients (S730). Specifically, the inverse transform 322 of the decoding apparatus may derive the residual samples for the current block by applying the inverse transform to the derived transform coefficients.

The decoding apparatus according to an embodiment may generate a reconstructed picture based on the residual samples for the current block (S740). Specifically, the adder 340 of the decoding apparatus may generate the reconstructed picture based on the residual samples for the current block.

In an embodiment, the unit of the current block may be a transform block (TB).

In an embodiment, each of the transform coefficients for the current block may be related to a high-frequency transform coefficient region including a transform coefficient of 0 or a low-frequency transform coefficient region including at least one significant transform coefficient.

In an embodiment, the residual information may include last significant coefficient prefix information and last significant coefficient suffix information on the position of a last significant transform coefficient among the transform coefficients for the current block.

In one example, the last significant coefficient prefix information may have a maximum value determined based on the size of a zero-out block.

In an embodiment, the position of the last significant transform coefficient may be determined based on a prefix codeword indicating the last significant coefficient prefix information and the last significant coefficient suffix information.

In an embodiment, the maximum length of the prefix codeword may be determined based on the low-frequency transform coefficient region, that is, the size of the zero-out block.

In an embodiment, the size of the zero-out block may be determined based on the width and height of the current block.

In an embodiment, the last significant coefficient prefix information may include x-axis prefix information and y-axis prefix information, and the prefix codeword may be a codeword on the x-axis prefix information and a codeword for the y-axis prefix information.

In one example, the x-axis prefix information may be expressed as last_sig_coeff_x_prefix, the y-axis prefix information may be expressed as last_sig_coeff_y_prefix, and the position of the last significant transform coefficient may be expressed as (LastSignificantCoeffX, LastSignificantCoeffY).

In an embodiment, the residual information may include information on the size of the zero-out block.

Figure 8:
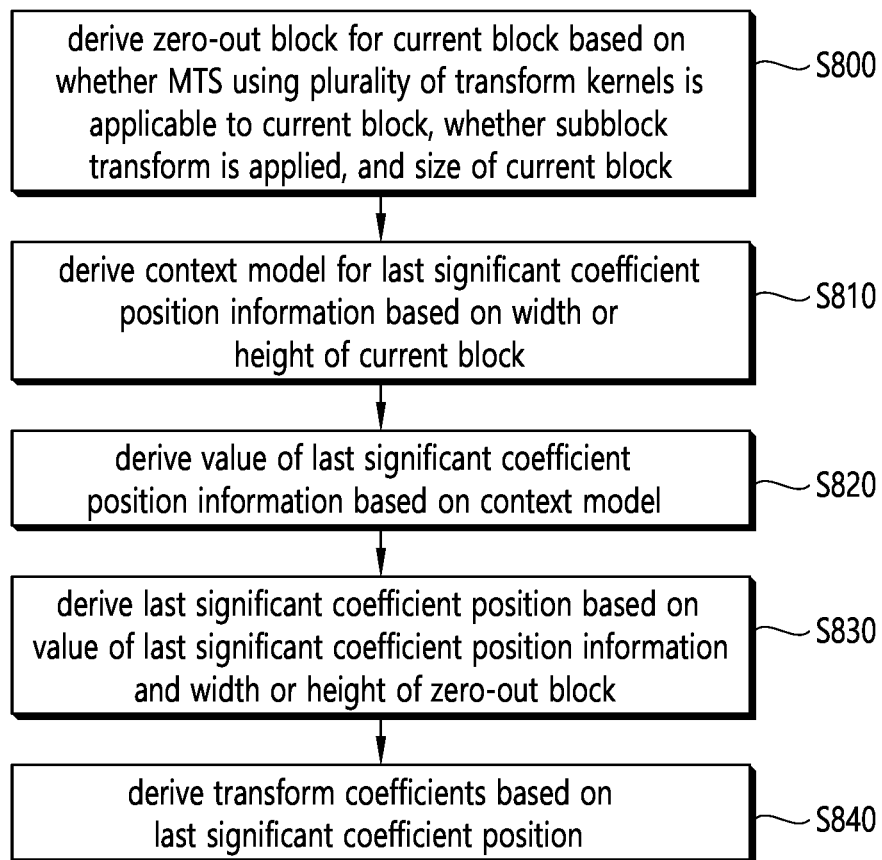
FIG. 8 is a flowchart illustrating a process for deriving a transform coefficient by a video decoding apparatus according to an embodiment of the present disclosure.

FIG. 8 is a flowchart illustrating a process for deriving a transform coefficient by a video decoding apparatus according to an embodiment of the present disclosure.

Each operation illustrated in FIG. 8 may be performed by the decoding apparatus 300 illustrated in FIG. 3. Specifically, S800 to S840 may be performed by the entropy decoder 310 illustrated in FIG. 3.

First, as illustrated, a zero-out block for a current block may be derived (S800). As described above, the zero-out block refers to a low-frequency transform coefficient region including a non-zero significant transform coefficient, and the width or height of the zero-out block may be derived based on whether an MTS using a plurality of transform kernel is applicable to the current block, whether a subblock transform is applied, and the width or height of the current block.

According to an example, the decoding apparatus may set the width or height of the zero-out block to 16 when the MTS is applied, and may set the width or height of the zero-out block to 32 or less when the MTS is not applied. In this case, whether the MTS is applicable may be determined based on sps_mts_enabled_flag indicating whether the MTS is applicable.

Specifically, when DST-7 or DCT-8 is applied rather than DCT-2 as a transform kernel used for an inverse primary transform, the width of the current block is 32, and the height of the current block is 32 or less, the width of the zero-out block may be set to 16. When the above conditions are not satisfied, that is, when the transform kernel is DCT-2, the width of the current block is not 32, or the height of the current block is 64 or greater, the width of the zero-out block may be set to a smaller value of the width of the current block and 32.

Similarly, when DST-7 or DCT-8 is applied rather than DCT-2 as the transform kernel used for the inverse primary transform, the height of the current block is 32, and the width of the current block is 32 or less, the height of the zero-out block may be set to 16. When the above conditions are not satisfied, that is, when the transform kernel is DCT-2, the height of the current block is not 32, or the width of the current block is 64 or greater, the height of the zero-out block may be set to a smaller value of the height of the current block and 32.

Further, according to an example, the width or height of the zero-out block may be derived based on flag information (cu_sbt_flag) indicating whether the current block is partitioned into subblocks and transformed. For example, when the value of a flag indicating whether the current block is partitioned into subblocks and transformed is 1, the width of a partitioned subblock is 32, and the height of the subblock is less than 64, the width of a top-left region in which a non-zero transform coefficient may exist in the subblock may be set to 16. Alternatively, when the value of the flag indicating whether the current block is partitioned into subblocks and transformed is 1, the height of the partitioned subblock is 32, and the width of the subblock is less than 64, the height of the top-left region in which the non-zero transform coefficient may exist in the subblock may be set to 16.

The transform kernel may be derived based on the partition direction of the current block and the position of a subblock to which the transform is applied as shown in Table 10.

The width or height of the zero-out block may be derived based on an MTS index for the current block or flag information indicating whether the MTS is applied to transformation of the current block.

The size of the zero-out block may be smaller than the size of the current block. Specifically, the width of the zero-out block may be smaller than the width of the current block, and the height of the zero-out block may be smaller than the height of the current block.

In an embodiment, the size of the zero-out block may be one of 32×16, 16×32, 16×16, or 32×32.

In an embodiment, the size of the current block may be 64×64, and the size of the zero-out block may be 32×32.

The decoding apparatus may derive a context model for last significant coefficient position information based on the width or height of the current block (S810).

According to an example, the context model may be derived based on the size of an original transform block rather than the size of the zero-out block. Specifically, a context increment for x-axis prefix information and y-axis prefix information corresponding to last significant coefficient prefix information may be derived based on the size of the original transform block.

The decoding apparatus may derive a value of the last significant coefficient position information based on the derived context model (S820).

As described above, the last significant coefficient position information may include last significant coefficient prefix information and last significant coefficient suffix information, and the value of the last significant coefficient position may be derived based on the context model.

The decoding apparatus may derive the last significant coefficient position based on the derived value of the last significant coefficient position information and the width or the height of the zero-out block (S830).

In one example, the decoding apparatus may derive the last significant coefficient position within the range of the size of the zero-out block smaller than that of the current block rather than the original current block. That is, a transform coefficient to which transform is applied may be derived within the range of the size of the zero-out block rather than the current block.

In one example, the last significant coefficient prefix information may have a maximum value determined based on the size of the zero-out block.

In one example, the last significant coefficient position may be derived based on a prefix codeword indicating the last significant coefficient prefix information and the last significant coefficient suffix information, and the maximum length of the prefix codeword may be determined based on the size of the zero-out block.

The decoding apparatus may derive transform coefficients based on the last significant coefficient position derived based on the width or the height of the zero-out block (S840).

The transform coefficients may be derived through the residual coding process of Table 13.

Subsequently, the decoding apparatus may derive residual samples by performing at least one of the foregoing non-separable inverse secondary transform and the inverse primary transform based on Table 1 and Table 10.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 9:
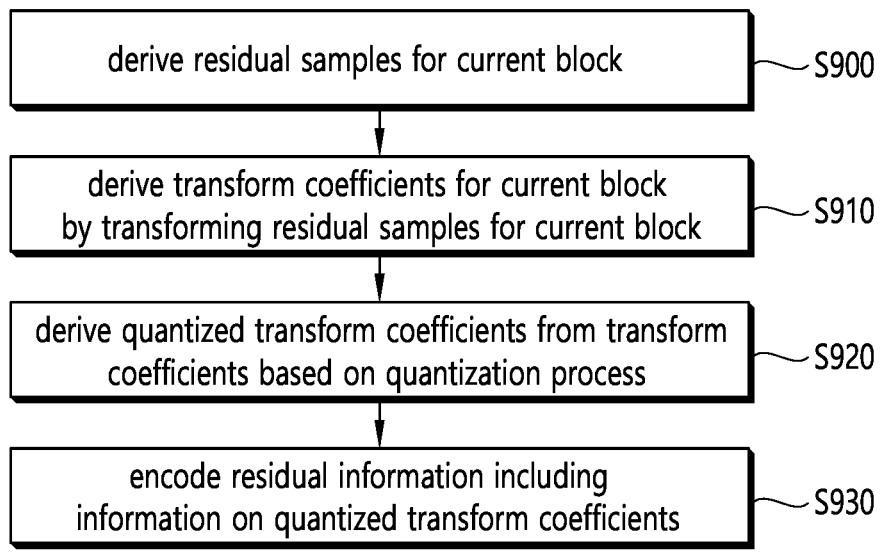
FIG. 9 is a flowchart illustrating the operation of a video encoding apparatus according to an embodiment of the present disclosure.

FIG. 9 is a flowchart illustrating the operation of a video encoding apparatus according to an embodiment of the present disclosure.

Each operation illustrated in FIG. 9 may be performed by the encoding apparatus 200 illustrated in FIG. 2. Specifically, S900 may be performed by the subtractor 231 illustrated in FIG. 2, S910 may be performed by the transformer 232 illustrated in FIG. 2, S920 may be performed by the quantizer 233 illustrated in FIG. 2, and FIG. 930 may be performed by the entropy encoder 240 illustrated in FIG. 2. Operations according to S900 to S930 are based on some of the foregoing details explained with reference to FIG. 4 to FIG. 6. Therefore, a description of specific details overlapping with those explained above with reference to FIG. 2 and FIG. 4 to FIG. 6 will be omitted or will be made briefly.

The encoding apparatus according to an embodiment may derive residual samples for a current block (S900). Specifically, the subtractor 231 of the encoding apparatus may derive the residual samples for the current block.

The encoding apparatus according to an embodiment may transform the residual samples for the current block, thereby deriving transform coefficients for the current block (S910). Specifically, the transformer 232 of the encoding apparatus may transform the residual samples for the current block, thereby deriving transform coefficients for the current block.

The encoding apparatus according to an embodiment may derive quantized transform coefficients from the transform coefficients based on quantization (S920). Specifically, the quantizer 233 of the encoding apparatus may derive the quantized transform coefficients from the transform coefficients based on the quantization.

The encoding apparatus according to an embodiment may encode residual information including information on the quantized transform coefficients (S930). Specifically, the entropy encoder 240 of the encoding apparatus may encode the residual information including the information on the quantized transform coefficients.

In an embodiment, each of the transform coefficients for the current block may be related to a high-frequency transform coefficient region including a transform coefficient of 0 or a low-frequency transform coefficient region including at least one significant transform coefficient, that is, a zero-out block.

In an embodiment, the residual information may include last significant coefficient prefix information and last significant coefficient suffix information on the position of a last significant transform coefficient among the transform coefficients for the current block.

In an embodiment, the position of the last significant transform coefficient may be determined based on a prefix codeword indicating the last significant coefficient prefix information and the last significant coefficient suffix information.

In one example, the last significant coefficient prefix information may have a maximum value determined based on the size of the zero-out block.

In an embodiment, the maximum length of the prefix codeword may be determined based on the size of the zero-out block.

In an embodiment, the size of the zero-out block may be determined based on the width and height of the current block.

In an embodiment, the last significant coefficient prefix information may include x-axis prefix information and y-axis prefix information, and the prefix codeword may be a codeword on the x-axis prefix information and a codeword for the y-axis prefix information.

In one example, the x-axis prefix information may be expressed as last_sig_coeff_x_prefix, the y-axis prefix information may be expressed as last_sig_coeff_y_prefix, and the position of the last significant transform coefficient may be expressed as (LastSignificantCoeffX, LastSignificantCoeffY)

In an embodiment, the residual information may include information on the size of the zero-out block.

Figure 10:
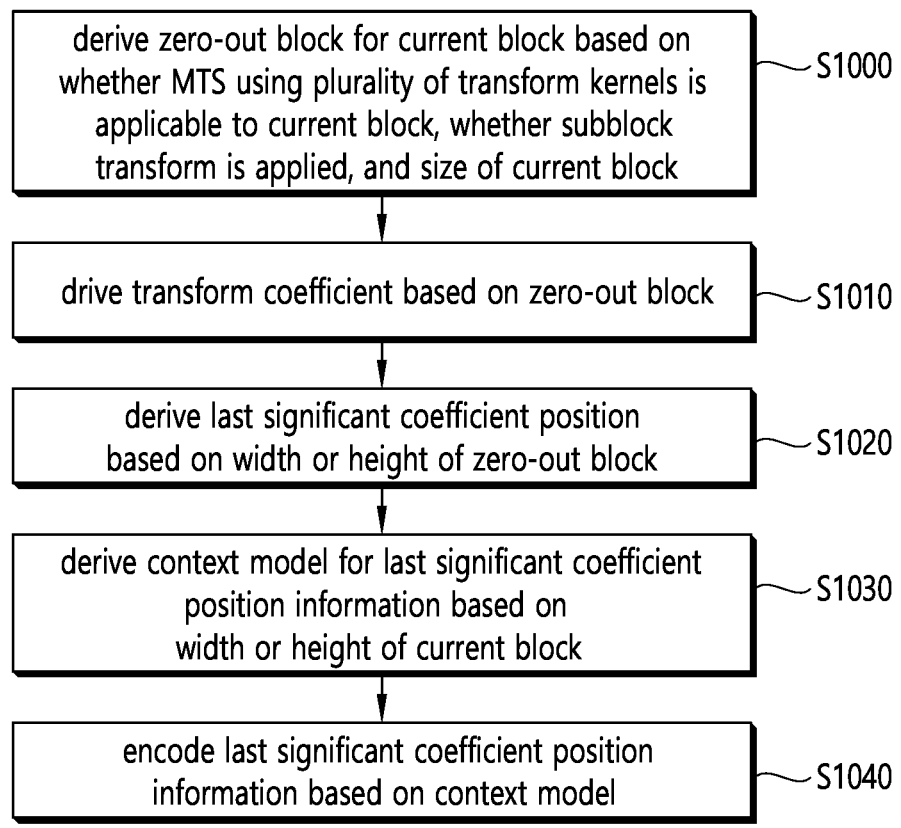
FIG. 10 is a flowchart illustrating a process for encoding a transform coefficient and information by a video encoding apparatus according to an embodiment of the present disclosure.

FIG. 10 is a flowchart illustrating a process for encoding a transform coefficient and information according to an embodiment of the present disclosure.

Each operation disclosed in FIG. 10 may be performed by the encoding apparatus 200 disclosed in FIG. 2. Specifically, S1000 and S1010 may be performed by the transformer 232, and S1020 to S1040 may be performed by the entropy encoder 240 disclosed in FIG. 2.

First, as illustrated, a zero-out block for a current block may be derived (S1000). As described above, the zero-out block refers to a low-frequency transform coefficient region including a non-zero significant transform coefficient, and the width or height of the zero-out block may be derived based on whether an MTS using a plurality of transform kernel is applicable to the current block, whether a subblock transform is applied, and the width or height of the current block.

According to an example, the encoding apparatus may set the width or height of the zero-out block to 16 when the MTS is applied (when DST-7/DCT-8 is applicable), and may set the width or height of the zero-out block to 32 or less when the MTS is not applied.

Specifically, when DST-7 or DCT-8 is applied rather than DCT-2 as a transform kernel used for a primary transform, the width of the current block is 32, and the height of the current block is 32 or less, the width of the zero-out block may be set to 16. When the above conditions are not satisfied, that is, when the transform kernel is DCT-2, the width of the current block is not 32, or the height of the current block is 64 or greater, the width of the zero-out block may be set to a smaller value of the width of the current block and 32.

Similarly, when DST-7 or DCT-8 is applied rather than DCT-2 as the transform kernel used for the primary transform, the height of the current block is 32, and the width of the current block is 32 or less, the height of the zero-out block may be set to 16. When the above conditions are not satisfied, that is, when the transform kernel is DCT-2, the height of the current block is not 32, or the width of the current block is 64 or greater, the height of the zero-out block may be set to a smaller value of the height of the current block and 32.

Further, according to an example, the width or height of the zero-out block may be derived based on whether the current block is partitioned into subblocks and transformed. For example, when the current block is partitioned into subblocks and transformed, the width of a partitioned subblock is 32, and the height of the subblock is less than 64, the width of the subblock may be set to 16. Alternatively, when the current block is partitioned into subblocks and transformed, the height of the partitioned subblock is 32, and the width of the subblock is less than 64, the height of the subblock may be set to 16.

The transform kernel may be derived based on the partition direction of the current block and the position of a subblock to which the transform is applied as shown in Table 10.

In an embodiment, the size of the zero-out block may be one of 32×16, 16×32, 16×16, or 32×32.

In an embodiment, the size of the current block may be 64×64, and the size of the zero-out block may be 32×32.

The encoding apparatus may drive a transform coefficient based on the zero-out block (S1010).

The encoding apparatus may derive the transform coefficient from residual samples by performing the foregoing transformation process, that, is at least one of the primary transform and the non-separable inverse secondary transform based on Table 1 and Table 10.

The encoding apparatus may derive a last significant coefficient position based on the derived width or height of the zero-out block (S1020).

In one example, the encoding apparatus may derive the last significant coefficient position within the range of the size of the zero-out block smaller than or equal to that of the current block rather than the original current block. That is, a transform coefficient to which transform is applied may be derived within the range of the size of the zero-out block rather than the current block.

In one example, the last significant coefficient position may be derived based on a prefix codeword indicating the last significant coefficient prefix information and the last significant coefficient suffix information, and the maximum length of the prefix codeword may be determined based on the size of the zero-out block.

The encoding apparatus may derive a context model for last significant coefficient position information based on the width or the height of the current block (S1030).

According to an embodiment, the context model may be derived based on the size of an original transform block rather than the size of the zero-out block. Specifically, a context increment for x-axis prefix information and y-axis prefix information corresponding to last significant coefficient prefix information may be derived based on the size of the original transform block.

The encoding apparatus may encode position information on the value of the last significant coefficient position based on the derived context model (S1040).

As described above, the last significant coefficient position information may include last significant coefficient prefix information and last significant coefficient suffix information, and the value of the last significant coefficient position may be encoded based on the context model.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

Further, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet).In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 11:
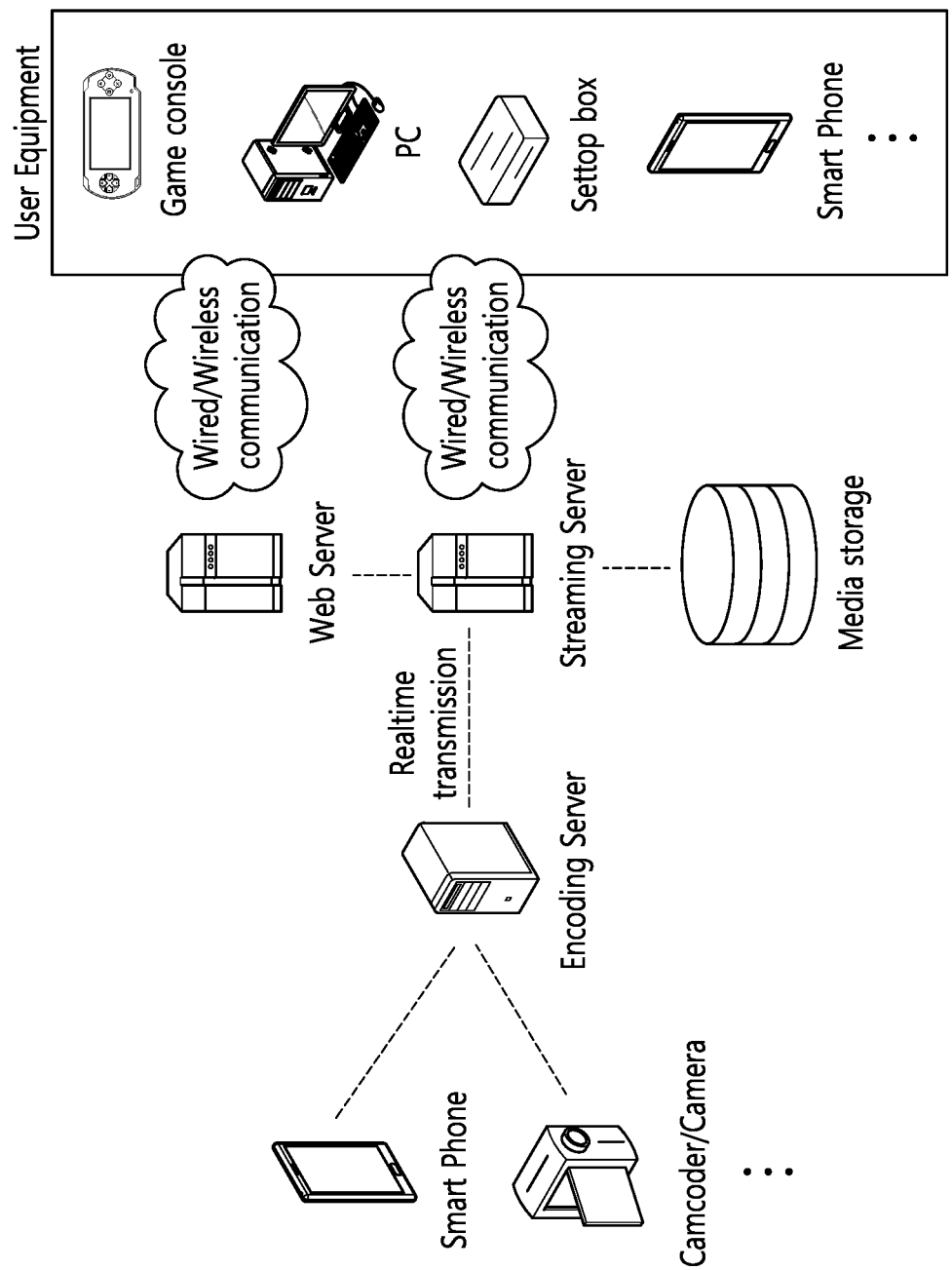
FIG. 11 illustrates the structure of a content streaming system to which the present disclosure is applied.

FIG. 11 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, comprising:
   receiving a bitstream including residual information;
   deriving transform coefficients for a current block based on the residual information; and
   deriving residual samples for the current block based on the transform coefficients,
   wherein deriving the transform coefficients comprises:
   deriving a zero-out block related to a region in which a significant transform coefficient exists in the current block; and
   deriving a position of a last significant coefficient based on last significant coefficient prefix information on the position of the last significant coefficient,
   wherein it is determined, based on at least one of a multiple transform selection (MTS) enabled flag or a subblock transform (SBT) flag, whether a width of the zero-out block is set to a fixed value pre-defined in the decoding apparatus,
   wherein the MTS enabled flag is signaled from a sequence parameter set (SPS) of the bitstream and indicates whether an MTS intra enabled flag and an MTS inter enabled flag are present in the SPS,
   wherein the MTS intra enabled flag equal to 1 indicates that MTS index information could be present for an intra coding unit, and the MTS intra enabled flag equal to 0 indicates that the MTS index information is not present for the intra coding unit,
   wherein the MTS inter enabled flag equal to 1 indicates that the MTS index information could be present for an inter coding unit, and the MTS inter enabled flag equal to 0 indicates that the MTS index information is not present for the inter coding unit,
   wherein the MTS index information indicates which transform kernels are applied to the current block,
   wherein the SBT flag indicates whether SBT is used for a coding block to which the current block belongs,
   wherein in response to a case where the MTS enabled flag indicates that the MTS intra enabled flag and the MTS inter enabled flag are present in the SPS and the SBT flag indicates that the SBT is used for the coding block, the width of the zero-out block is set to the fixed value,
   wherein in response to a case where the MTS enabled flag indicates that the MTS intra enabled flag and the MTS inter enabled flag are present in the SPS and the SBT flag indicates that the SBT is not used for the coding block, the width of the zero-out block is set to a value derived based on a width of the current block, and
   wherein in response to a case where the MTS enabled flag indicates that the MTS intra enabled flag and the MTS inter enabled flag are not present in the SPS, the width of the zero-out block is set to the value derived based on the width of the current block.

2. The image decoding method of claim 1, wherein a maximum value of the last significant coefficient prefix information is derived based on a size of the zero-out block.

3. The image decoding method of claim 1, wherein the zero-out block is derived for a luma component of the current block.

4. An image encoding method performed by an image encoding apparatus, comprising:
   deriving residual samples for a current block;
   deriving transform coefficients based on the residual samples for the current block; and
   encoding residual information comprising information on the transform coefficients and last significant coefficient prefix information on a position of a last significant coefficient,
   wherein deriving the transform coefficients comprises:
   deriving a zero-out block related to a region in which a significant transform coefficient exists in the current block,
   wherein it is determined, based on at least one of a multiple transform selection (MTS) enabled flag or a subblock transform (SBT) flag, whether a width of the zero-out block is set to a fixed value pre-defined in the image encoding apparatus,
   wherein the MTS enabled flag is encoded into a sequence parameter set (SPS) of a bitstream and indicates whether an MTS intra enabled flag and an MTS inter enabled flag are present in the SPS,
   wherein the MTS intra enabled flag equal to 1 indicates that MTS index information could be present for an intra coding unit, and the MTS intra enabled flag equal to 0 indicates that the MTS index information is not present for the intra coding unit,
   wherein the MTS inter enabled flag equal to 1 indicates that the MTS index information could be present for an inter coding unit, and the MTS inter enabled flag equal to 0 indicates that the MTS index information is not present for the inter coding unit,
   wherein the MTS index information indicates which transform kernels are applied to the current block,
   wherein the SBT flag indicates whether SBT is used for a coding block to which the current block belongs,
   wherein in response to a case where the MTS enabled flag indicates that the MTS intra enabled flag and the MTS inter enabled flag are present in the SPS and the SBT flag indicates that the SBT is used for the coding block, the width of the zero-out block is set to the fixed value, wherein in response to a case where the MTS enabled flag indicates that the MTS intra enabled flag and the MTS inter enabled flag are present in the SPS and the SBT flag indicates that the SBT is not used for the coding block, the width of the zero-out block is set to a value derived based on a width of the current block, and wherein in response to a case where the MTS enabled flag indicates that the MTS intra enabled flag and the MTS inter enabled flag are not present in the SPS, the width of the zero-out block is set to the value derived based on the width of the current block.

5. The image encoding method of claim 4,
wherein a maximum value of the last significant coefficient prefix information is derived based on a size of the zero-out block.

6. A non-transitory computer-readable digital storage medium that stores a bitstream generated by the image encoding method of claim 4.

7. A transmitting method of data for an image, comprising:
obtaining a bitstream for the image, wherein the bitstream is generated based on deriving residual samples for a current block, deriving transform coefficients based on the residual samples for the current block, and encoding residual information comprising information on the transform coefficients and last significant coefficient prefix information on a position of a last significant coefficient; and
transmitting the data comprising the bitstream,
wherein deriving the transform coefficients comprises deriving a zero-out block related to a region in which a significant transform coefficient exists in the current block,
wherein it is determined, based on at least one of a multiple transform selection (MTS) enabled flag or a subblock transform (SBT) flag, whether a width of the zero-out block is set to a fixed value,
wherein the MTS enabled flag is encoded into a sequence parameter set (SPS) of the bitstream and indicates whether an MTS intra enabled flag and an MTS inter enabled flag are present in the SPS,
wherein the MTS intra enabled flag equal to 1 indicates that MTS index information could be present for an intra coding unit, and the MTS intra enabled flag equal to 0 indicates that the MTS index information is not present for the intra coding unit,
wherein the MTS inter enabled flag equal to 1 indicates that the MTS index information could be present for an inter coding unit, and the MTS inter enabled flag equal to 0 indicates that the MTS index information is not present for the inter coding unit,
wherein the MTS index information indicates which transform kernels are applied to the current block,
wherein the SBT flag indicates whether SBT is used for a coding block to which the current block belongs,
wherein in response to a case where the MTS enabled flag indicates that the MTS intra enabled flag and the MTS inter enabled flag are present in the SPS and the SBT flag indicates that the SBT is used for the coding block, the width of the zero-out block is set to the fixed value,
wherein in response to a case where the MTS enabled flag indicates that the MTS intra enabled flag and the MTS inter enabled flag are present in the SPS and the SBT flag indicates that the SBT is not used for the coding block, the width of the zero-out block is set to a value derived based on a width of the current block, and
wherein in response to a case where the MTS enabled flag indicates that the MTS intra enabled flag and the MTS inter enabled flag are not present in the SPS, the width of the zero-out block is set to the value derived based on the width of the current block.

\* \* \* \* \*